(12) United States Patent
Suzuki

(10) Patent No.: US 8,604,730 B2
(45) Date of Patent: Dec. 10, 2013

(54) ELECTRIC POWER CONVERTER, DRIVING APPARATUS AND ELECTRIC POWER STEERING APPARATUS

(75) Inventor: Takashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 39 days.

(21) Appl. No.: 13/136,827

(22) Filed: Aug. 11, 2011

(65) Prior Publication Data

US 2012/0049782 A1 Mar. 1, 2012

(30) Foreign Application Priority Data

Aug. 27, 2010 (JP) ................................. 2010-190438

(51) Int. Cl.
*H02P 6/00* (2006.01)
(52) U.S. Cl.
USPC ......... 318/400.02; 318/722; 363/37; 363/132
(58) Field of Classification Search
USPC ...................... 318/34–113, 807, 400.02, 722; 363/807, 37, 132
See application file for complete search history.

(56) References Cited

U.S. PATENT DOCUMENTS

| 4,814,964 | A | | 3/1989 | Schauder et al. | |
| 5,982,067 | A | * | 11/1999 | Sebastian et al. | ............. 310/184 |
| 2010/0071970 | A1 | * | 3/2010 | Welchko et al. | ............. 180/65.1 |
| 2011/0074320 | A1 | * | 3/2011 | Nakamura et al. | ........ 318/400.02 |
| 2011/0122661 | A1 | * | 5/2011 | Sakakibara | ..................... 363/37 |
| 2012/0001581 | A1 | * | 1/2012 | Sumita et al. | ................. 318/490 |
| 2012/0187893 | A1 | * | 7/2012 | Baba et al. | ..................... 318/722 |

FOREIGN PATENT DOCUMENTS

| JP | 2001-197779 | 7/2001 |
| JP | 2007-306705 | 11/2007 |

OTHER PUBLICATIONS

U.S. Appl. No. 13/042,683, filed Mar. 8, 2011, Suzuki.

* cited by examiner

*Primary Examiner* — Eduardo Colon Santana
*Assistant Examiner* — Bickey Dhakal
(74) *Attorney, Agent, or Firm* — Harness, Dickey & Pierce, PLC

(57) ABSTRACT

A control unit of an electric power converter, which is used in a three-phase motor having two winding wire systems, performs for a first duty instruction signal regarding a voltage applied to a first winding wire group a flatbed two-phase modulation process, and performs for a second duty instruction signal regarding a voltage applied to a second winding wire group a flattop two-phase modulation process. By phase-shifting the second duty instruction signal by 30° from the first duty instruction signal, a timing of maximum value of the first duty instruction signal is shifted from a timing of minimum value of the second duty instruction signal. Even when the maximum value is greater than a center output value and the minimum value is smaller than the center output value, overlapping of capacitor discharge is avoided, thereby reducing a ripple electric current.

11 Claims, 25 Drawing Sheets

FIG. 3A
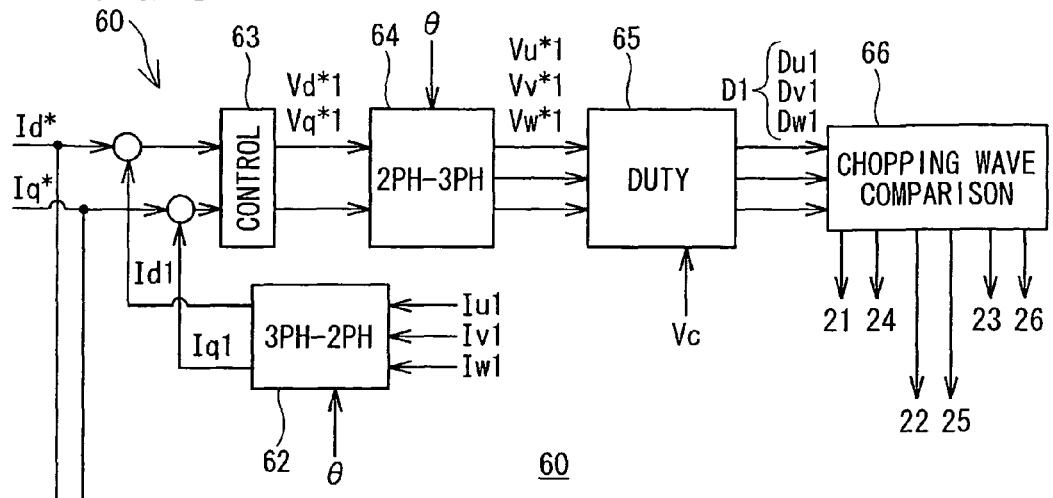
FIG. 3B
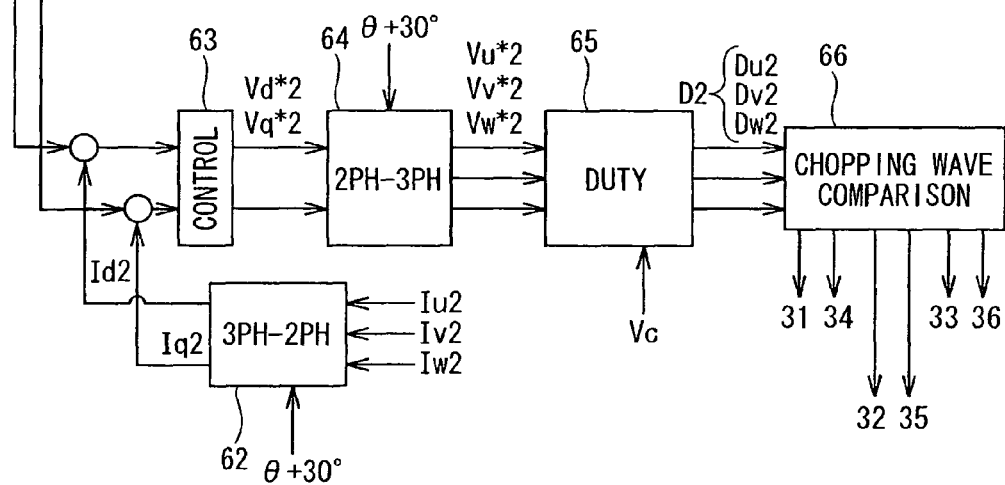
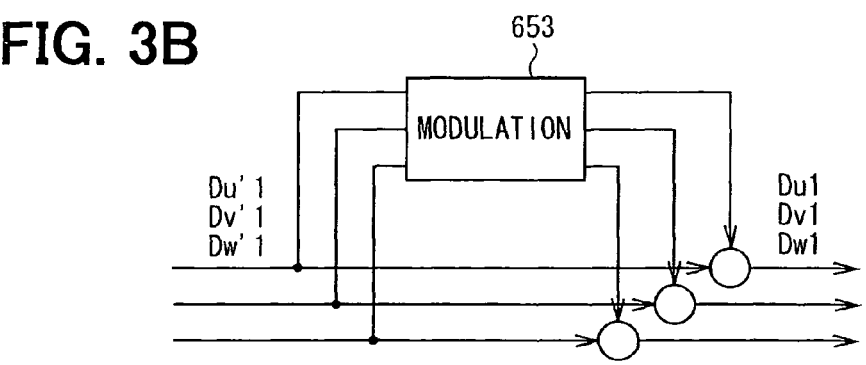

FIG. 5

| VOLTAGE VECTOR | TURNED-ON FET | | |
|---|---|---|---|
| | U | V | W |
| ZERO VOLTAGE — V0 | FET 24 | FET 25 | FET 26 |
| V1 | FET 21 | FET 25 | FET 26 |
| V2 | FET 21 | FET 22 | FET 26 |
| EFFECTIVE VOLTAGE — V3 | FET 24 | FET 22 | FET 26 |
| V4 | FET 24 | FET 22 | FET 23 |
| V5 | FET 24 | FET 25 | FET 23 |
| V6 | FET 21 | FET 25 | FET 23 |
| ZERO VOLTAGE — V7 | FET 21 | FET 22 | FET 23 |

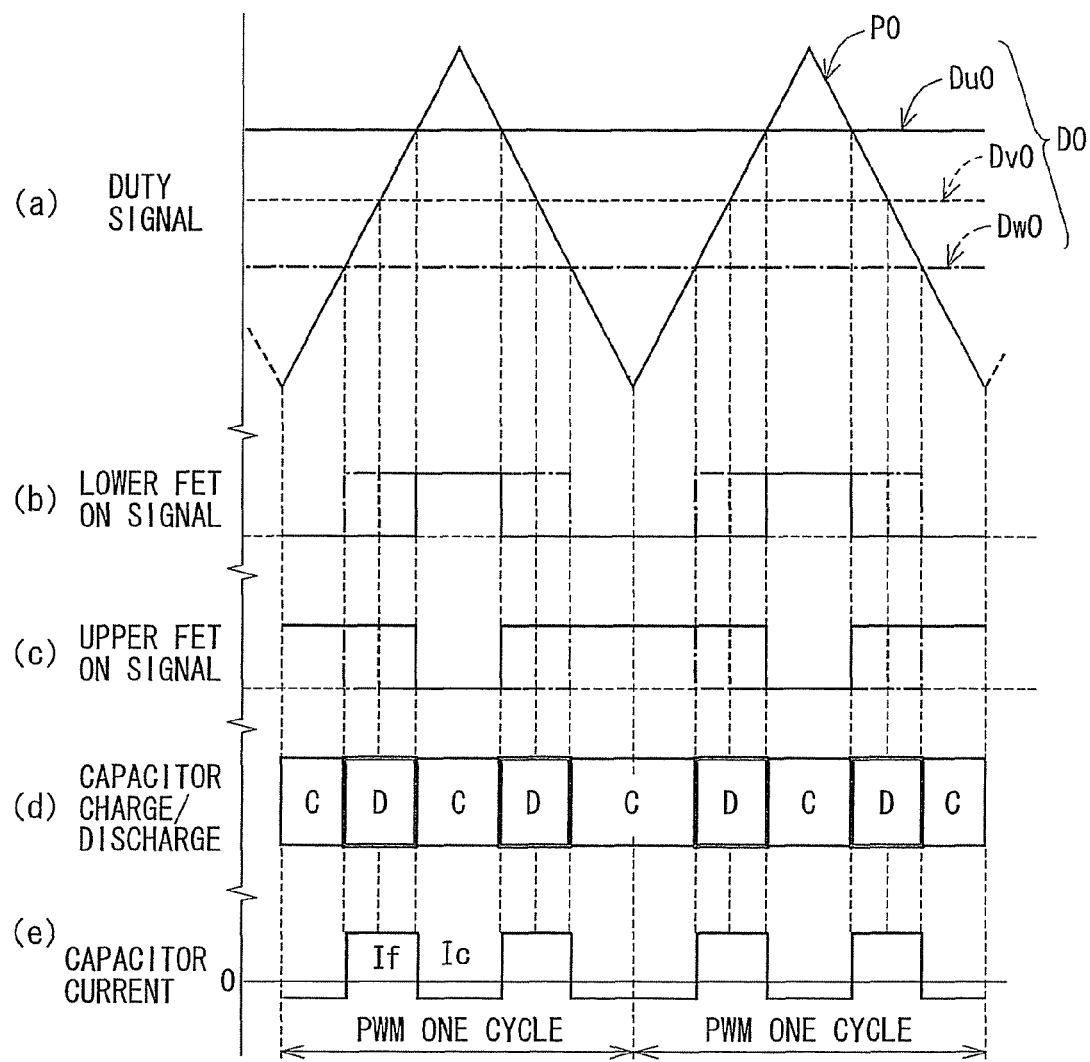

ELECTRIC POWER CONVERTER, DRIVING APPARATUS AND ELECTRIC POWER STEERING APPARATUS

CROSS REFERENCE TO RELATED APPLICATION

The present application is based on and claims the benefit of priority of Japanese Patent Application No. 2010-190438 filed on Aug. 27, 2010, the disclosure of which is incorporated herein by reference.

FIELD OF THE INVENTION

The present invention generally relates to an electric power converter for driving a three-phase rotary electric machine, a driving apparatus including the electric power converter, and an electric power steering apparatus using the driving apparatus.

BACKGROUND INFORMATION

Conventionally, pulse width modulation (PWM) control is used to control electric current for driving a multi-phase rotary electric machine. For example, if the multi-phase rotary electric machine is a three-phase motor, the electric current supplied to the three-phase motor is controlled by (a) comparing a voltage instruction signal regarding a voltage to be applied to respective winding wires of three phases with a PWM reference signal such as a chopping wave or the like, and (b) switching between ON and OFF of switching elements of an inverter based on the comparison. Generally, between the power supply side and the ground side of the inverter, a capacitor is provided to smooth the power supply voltage.

Regarding electric current of the capacitor, when electric current does not flow from a battery to a power supply side of the inverter, the electric current flows from the battery to the capacitor, and the capacitor is charged. On the other hand, when the electric current flows from the battery to the power supply side of the inverter, the electric current flows out from the capacitor to the inverter, and the capacitor discharges electricity. When the inverter is controlled by PWM control, charging and discharging of the capacitor is repeated during one cycle of PWM control, and the capacitor electric current pulsates. Such pulse current is designated as ripple electric current.

Further, when one inverter and a group of three winding wires corresponding to that inverter is designated as one system, the capacitor electric currents from two systems add up if charging and discharging due to PMW control by the inverters in the two systems occur at the same timing, thereby causing an increase of the ripple electric current.

The increase of the ripple electric current causes noise and heat generation of the capacitor. Further, as the applied voltage on the inverter changes, the controllability of the electric current by the inverter deteriorates. Therefore, a motor driving apparatus in the following patent document 1 smoothes a waveform of capacitor electric current, by phase-shifting PWM reference signals (i.e., a carrier signal in the patent document 1) of inverters in two systems to have different switch ON-OFF timings of switching elements, for reducing ripple electric current.

Further, a PWM amplifier in the following patent document 2 reduces ripple electric current when a PWM amplifier is used simultaneously in two systems (i.e., in two axes in the patent document 2), by shifting a neutral point voltage (i.e., an average of voltage instruction signals) to a high voltage side in one system and by shifting the neutral point voltage to a low voltage side in the other system, thereby bringing switching ON-OFF timings of the two systems to different timings.

(Patent document 1) JP 2001-197779A
(Patent document 2) JP 2007-306705A

However, even after phase-shifting the PWM reference signals from each other in two systems, or even after shifting the neutral point voltages of the voltage instruction signals from each other in two systems, a shifting range of switch ON-OFF timing of the switching elements is limited, because the voltage instruction signals of two systems have the same phase in both of the patent documents 1 and 2. For example, when the difference between the maximum value and the minimum value of the voltage instruction signal, that is, a doubled value of the amplitude, exceeds 50% of an allowable voltage output range that can be output, the discharge timings of the capacitors of the two systems cannot be completely shifted away from each other, thereby making it impossible to sufficiently reduce the ripple electric current.

SUMMARY OF THE INVENTION

It is therefore an object of the present invention to provide an electric power converter that reduces ripple electric current of a capacitor by increasing an adjustment range of a switching ON-OFF timing of switching elements.

According to the present invention, an electric power converter is provided for a three-phase rotary electric machine, which includes two groups of winding wires that correspond to each phase of the rotary electric machine. The electric power converter has two inverter units as well as a capacitor and a control unit. Two inverter units respectively include a bridge circuit formed of a high voltage side switching element and a low voltage side switching element, the two switching elements corresponding to two groups of winding wires. The capacitor is connected between a power supply side and a ground side of the two inverter units.

The control unit controls ON-OFF switching of the high voltage side switching element and the low voltage side switching element by comparing a voltage instruction signal regarding a voltage to be applied to two groups of winding wires with a predetermined PWM reference signal.

The control unit performs a modulation process that modulates the voltage instruction signal regarding the voltages respectively applied to two groups of winding wires, so that effective voltage vector generation periods in the two inverter units do not overlap with each other. Further, the control unit shifts respective phases of the voltage instruction signals regarding the voltages applied to two groups of winding wires by (30+120×n) degrees (n: integer). In such a case, the modulation process includes a process that shifts a neutral point voltage (i.e., an average of voltage instruction signals) to a high voltage side or to a low voltage side within an allowable voltage output range that can be output.

Further, the effective voltage vector generation period indicates a period during which (a) the first phase or the second phase of one of the high voltage side switching element and the low voltage side switching element is being turned on and (b) the second phase or the first phase of the other one of the two switching elements is being turned off. In the effective voltage vector generation period, electric charge stored in the capacitor is discharged to the inverter unit.

The control unit shifts the phase of the voltage instruction signal regarding driving of the two inverter units by (30+120× n) degrees from each other, thereby avoiding overlapping of the effective voltage vector generation periods (i.e., a capacitor discharge period). More practically, even when the doubled value of the amplitude exceeds 50% of the allowable voltage output range that can be output within a predetermined range, the overlapping of the effective voltage vector generation periods can be avoided. In this manner, the ripple electric current of the capacitor can be further reduced. As a result, the noise and the heat dissipation of the capacitor are prevented, and the controllability of the electric current from the inverter is preferably maintained.

Further, a period during which (a) all phases of one of the high voltage side switching element and the low voltage side switching element are being turned on and (b) all phases of the other of the high voltage side switching element and the low voltage side switching element are being turned off is designated as a zero voltage vector generation period. The capacitor is charged in the zero voltage vector generation period. The zero voltage vector generation period is a remaining period that is derived by subtracting the effective vector generation period from one cycle of PWM. The capacitor electric current in the zero voltage vector generation period flows in an opposite direction to a flow direction of the capacitor electric current in the effective voltage vector generation period, and is smaller than the capacitor electric current in the effective voltage vector generation period. Therefore, the overlapping of charge periods of two inverter units has a smaller influence than the overlapping of discharge periods of two inverter units.

BRIEF DESCRIPTION OF THE DRAWINGS

The other objects, features and advantages of the present invention will become more apparent from the following detailed description made with reference to the accompanying drawings. In the drawings:

FIGS. 3A and 3B are block diagrams of a control unit in the first embodiment of the present invention;

FIG. 5 is a table of a voltage vector pattern generated by the PWM control;

FIG. 6 is a time chart of a capacitor electric current in the PWM control;

DETAILED DESCRIPTION OF THE PREFERRED EMBODIMENT (First Embodiment)

Figure 1:
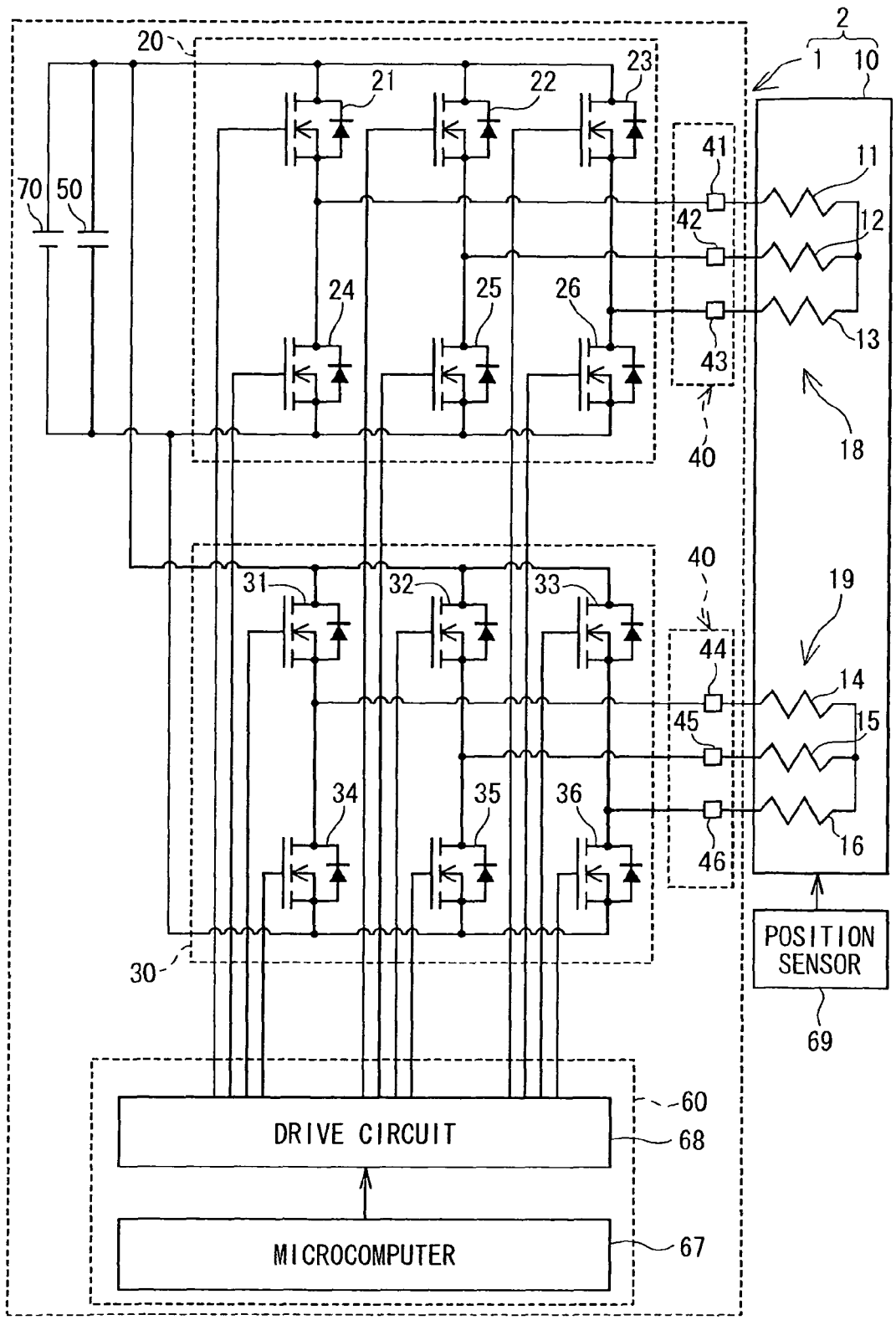
FIG. 1 is a circuit diagram of an electric power converter in a first embodiment of the present invention.

Referring to FIG. 1, an electric power converter 1 is provided to control driving of a three-phase motor 10 as a rotary electric machine. For example, the electric power converter 1 and the motor 10 form a driving apparatus 2, which is applied to an electric power steering apparatus to assist steering operation of a vehicle.

The electric power converter 1 includes two systems (#1 and #2) of inverter units, and drives two systems of winding wire combinations (i.e., groups) of the motor 10. Here, the term system is used to indicate a unit, which is a combination (i.e., a group) of one inverter unit and three-phase winding wires corresponding to one inverter unit.

The inverter unit and a group of winding wires in the first system (#1) are respectively designated as a first inverter unit 20 and a first winding wire group 18, and the inverter unit and a group of winding wires in the second system (#2) are respectively designated as a second inverter unit 30 and a second winding wire group 19. The first winding wire group 18 and the second winding wire group 19 form two groups of winding wires, and the first inverter unit 20 and the second inverter unit 30 form two inverter units.

Figure 2:
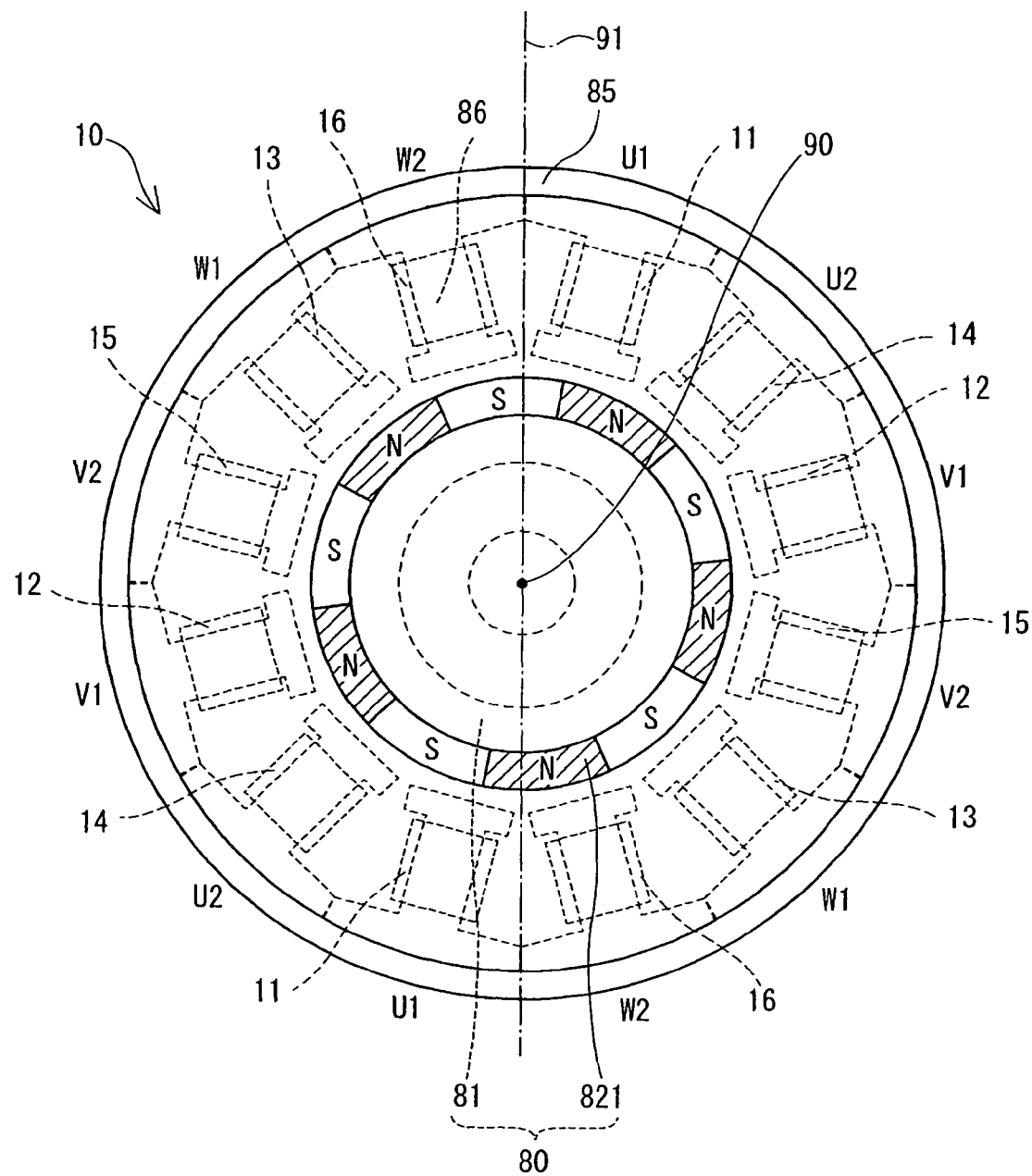
FIG. 2 is a schematic side view of a motor in the first embodiment of the present invention.

As shown in FIG. 2, which shows a side cross section along a plane that perpendicularly intersect with its longitudinal axis, the motor 10 is a three-phase brushless motor, and has a rotor 80 and a stator 85.

The rotor 80 is installed in a radial-inside of the stator 85, in a rotatable manner. The rotor 80 is, for example, formed in the shape of a cylinder from magnetic material such as iron, and has a permanent magnet set 821 installed on a radial-outside of a rotor core 81. The permanent magnet set 821 has five pairs of N and S poles, which amounts to a total of ten poles.

The stator 85 accommodates the rotor 80 in its inside, holds the rotor 80 rotatably. The stator 85 has twelve pieces of protrusions 86 protruding in a radial-inward direction and being disposed equi-angularly at every 30 degrees. The stator 85 has coils 11 to 16, as shown in FIG. 1, which are wound on the protrusions 86 to form stator coils. The stator coils are formed as two groups of coils, both of two groups have a U1 coil 11, a U2 coil 14, a V1 coil 12, a V2 coil 15, a W1 coil 13 and a W2 coil 16 arranged in this order in a clockwise direction, and two groups of coils are positioned in a point-symmetrical manner around a rotation axis 90. That is, the first coil group is arranged on one side of a virtual plane 91 that includes the rotation axis 90, and the second coil group is arranged on the other side of the virtual plane 91.

The U1 coil 11, the V1 coil 12 and the W1 coil 13 form the first winding wire group 18, and the U2 coil 14, the V2 coil 15 and the W2 coil 16 form the second winding wire group 19.

Due to the above arrangement of coils, the coils 14, 15, 16 in the second winding wire group 19 are positioned at 30 degrees advanced in the clockwise direction relative to the coils 11, 12, 13 in the first winding wire group 18. According to such arrangement, as described later, the phase of a second duty instruction signal D2 affecting driving of the second inverter unit 30 can be advanced by 30 degrees relative to the phase of a first duty instruction signal D1 affecting driving of the first inverter unit 20.

Referring again to FIG. 1, the motor 10 has a position sensor 69 for detecting an angle of rotation of the rotor 80'. The electric power converter 1 includes the first inverter unit 20, the second inverter unit 30, an electric current detection unit 40, a capacitor 50, a control unit 60, a battery 70, together with other parts.

The first inverter unit 20 is a three-phase inverter, and six switching elements 21 to 26 in the first inverter unit 20 are connected by a bridge connection, for switching electric currents to be supplied for each of the U1 coil 11, the V1 coil 12, the W1 coil 13 in the first winding wire group 18. The switching elements 21 to 26 are metal-oxide-semiconductor field-effect transistor elements (i.e., MOSFETs), which are one kind of field effect transistor. The switching elements 21 to 26 are designated as FETs 21 to 26.

A drain of each of three FETs 21 to 23 is connected to a positive-polarity side of the battery 70. Further, a source of each of FETs 21 to 23 is connected to a drain of each of FETs 24 to 26. A source of each of FETs 24 to 26 is connected to a negative-polarity side of the battery 70.

The connection points between three pairs of FETs, that is, FETs 21, 22, 23 and FETs 24, 25, 26, are respectively connected to one end of the U1 coil 11, the V1 coil 12, and the W1 coil 13.

The second inverter unit 30 is, same as the first inverter unit 20, a three-phase inverter, and six switching elements 31 to 36 are connected by a bridge connection, for switching electric currents to be supplied for each of the U2 coil 14, the V2 coil 15, the W2 coil 16 in the second winding wire group 19. The switching elements 31 to 36 are MOSFET elements, just like switching elements 21 to 26. The switching elements 31 to 36 are designated as FETs 31 to 36.

A drain of each of three FETs 31 to 33 is connected to the positive-polarity side of the battery 70. Further, a source of each of FETs 31 to 36 is connected to a drain of each of FETs 34 to 36: A source of each of FET 34 to 36 is connected to the negative-polarity side of the battery 70.

The connection points between three pairs of FETs, that is, FETs 31, 32, 33 and FETs 34, 35, 36, are respectively connected to one end of the U2 coil 14, the V2 coil 15, and the W2 coil 16.

The FETs 21 to 23 and the FETs 31 to 33, which are high voltage side switching elements, are designated as upper FETs, respectively. The FETs 24 to 26 and the FETs 34 to 36, which are low voltage side switching elements, are designated as lower FETs, respectively.

The electric current detection unit 40 includes a U1 current detector 41, a V1 current detector 42, a W1 current detector 43, a U2 current detector 44, a V2 current detector 45 and a W2 current detector 46.

The U1 current detector 41 is disposed between (a) a connection point of the FET 21 and of the FET 24 and (b) the U1 coil 11, and detects an electric current flowing to the U1 coil 11. The V1 current detector 42 is disposed between (a) a connection point of FET 22 and FET 25 and (b) the V1 coil 12, and detects an electric current flowing to the V1 coil 12. The W1 current detector 43 is disposed between (a) a connection point of FET 23 and FET 26 and (b) the W1 coil 13, and detects electric current flowing to the W1 coil 13.

The U2 current detector 44 is disposed between (a) a connection point of FET 31 and FET 34 and (b) the U2 coil 14, and detects an electric current flowing to the U2 coil 14. The V2 current detector 45 is disposed between (a) a connection point of FET 32 and FET 35 and (b) the V2 coil 15, and detects an electric current flowing to the V2 coil 15. The W2 current detector 46 is disposed between a connection point of FET 33 and FET 36 and (b) the W2 coil 16, and detects an electric current flowing to the W2 coil 16.

The electric current detectors 41 to 46 detect magnetic flux by using Hall elements.

The current detection value outputted by the electric current detectors 41 to 46 (designated as an AD value, hereinafter) and a rotation angle detection value of the motor 10 detected by the position sensor 69 are respectively converted into an electrical angle, and the electrical angle is memorized in a register which forms the control unit 60. In FIG. 1, control lines from the electric current detection unit 40 and the position sensor 69 to the control unit 60 are omitted, for avoiding unnecessary complication of the diagram.

The capacitor 50 is connected between (a) a power supply side and (b) a ground side of the battery 70, the first inverter unit 20 the second inverter unit 30, and supplements a power supply for the FETs 21 to 26 and 31 to 36 by saving an electric charge, and prevents noise components of surge currents, for example.

The control unit 60 controls the whole of the electric power converter 1, and includes a microcomputer 67, a register (not illustrated), a drive circuit 68, and the like. As shown in FIG. 3A, the control unit 60 has, for each of the first and second systems, a three-phase/two-phase converter 62, a controller 63, a two-phase/three-phase converter 64, a duty calculator 65, a chopping wave comparison unit 66, together with other components.

In the first system and the second system, the electrical angles acquired respectively by the three-phase/two-phase converter 62 and the two-phase/three-phase converter 64 has the phase difference of 30 degrees from each other. That is, when the electrical angle acquired in the first system is $\theta$, the electrical angle acquired in the second system is $\theta+30$. Since other features of the control unit 60 have the same configuration in both of the first and second systems, only the control unit 60 in the first system is explained as a representative example.

The three-phase/two-phase converter 62 calculates current values Iu1, Iv1, Iw1 in the coils 11 to 13, based on the current detection value by the electric current detectors 41 to 43. Then, based on the calculated current values Iu1, Iv1, Iw1 and the electrical angle θ, a d-axis electric current detection value Id1 and a q-axis electric current detection value Iq1 are calculated.

An electric current feedback control calculation is performed based on the d-axis instruction electric current value Id* and the q-axis instruction electric current value Iq* and the d-axis electric current detection value Id1 and the q-axis electric current detection value Iq1, and the d-axis instruction voltage value Vd*1 and the q-axis instruction voltage value Vq*1 are calculated. More specifically, an electric current deviation ΔId1 between the d-axis instruction electric current value Id* and the d-axis electric current detection value Id1, and an electric current deviation ΔIq1 between the q-axis instruction electric current value Iq* and the q-axis electric current detection value Iq1 are respectively calculated, and the instruction voltage value Vd*1 and the instruction voltage value Vq*1 that make both of the electric current deviations ΔId1 and ΔIq1 converge to 0 are calculated.

In the two-phase/three-phase converter 64, three-phase instruction voltages Vu*1, Vv*1, Vw*1 are calculated based on the instruction voltage values Vd*1 and Vq*1 calculated in the controller 63 and the electrical angle θ.

In the duty calculation unit 65, a pre-modulation U-phase duty Du'1, a pre-modulation V-phase duty Dv'1, and a pre-modulation W-phase duty Dw'1 are calculated based on the three-phase instruction voltages Vu*1, Vv*1, Vw*1 and a capacitor voltage Vc. Each of the phase duties Du'1, Dv'1, Dw'1 is given, for example, as a sine wave signal having a substantially same amplitude with the phase difference of 120° from each other.

In such a case, the amplitude indicates one half of the difference between the maximum signal value and the minimum signal value.

A modulation processor 653 provided in the duty calculator 65 as shown in FIG. 3B outputs a post-modulation U-phase duty Du1, a post-modulation V-phase duty Dv1, and a post-modulation W-phase duty Dw1, by performing a modulation process on each of the pre-modulation phase duties Du'1, Dv'1, Dw'1. Practical contents of the modulation process are described later.

The U-phase duty Du1 is for a voltage that is applied to the U1 coil 11, and the V-phase duty Dv1 is for a voltage applied to the V1 coil 12, and the W-phase duty Dw1 is for a voltage applied to the W1 coil 13. Each of the phase duties Du1, Dv1, Dw1 form the first duty instruction signal D1 affecting driving of the first inverter unit 20.

Regarding the second system, each of the phase duties Du2, Dv2, Dw2 form the second duty instruction signal D2 affecting driving of the second inverter unit 30 in the same manner as the first system.

The first duty instruction signal D1, the second duty instruction signal D2 and each of the phase duties Du1, Dv1, Dw1, Du2, Dv2, Dw2 are voltage instruction signals.

In the chopping wave comparison unit 66, an on/off signal of FETs 21 to 26 is calculated by comparing each of the post-modulation phase duties Du1, Dv1, Dw1 with the PWM reference signal which is a carrier signal of the chopping wave in a triangular waveform. Further, the process of the chopping wave comparison unit 66 is calculated in an electric circuit of the microcomputer 67. This process may be performed either as a software process or a hardware process.

FIGS. 4A to 8B are used to explain a general PWM control, prior to a special PWM control in the first embodiment. In this general explanation, the last digit of the sign of each signal is designated as 0. Further, the signs such as FET correspond to the configuration of the first system.

Figure 4A:
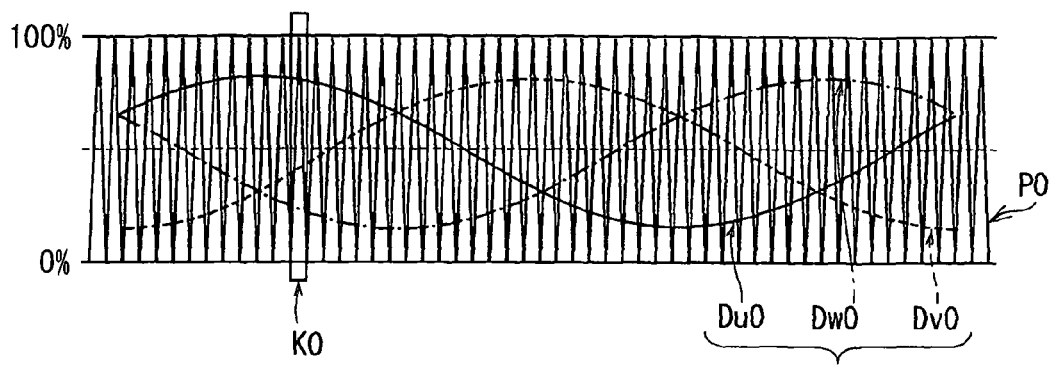
FIGS. 4A to 4C are illustrations of PWM control.

As shown in FIG. 4A, a duty instruction signal D0 is made up of three sine wave signals, that is, a U-phase duty Du0, a V-phase duty Dv0 and a W-phase duty Dw0, which have substantially the same amplitude, with the center value (i.e., the average of the maximum value and the minimum value) being equal to about 50% duty, and with mutual phase difference of 120°.

A PWM reference signal P0 is a chopping wave signal. One cycle of the PWM reference signal P0 is extremely shorter in comparison to one cycle of the duty instruction signal D0. The number of the PWM reference signals P0 in one cycle of the duty instruction signal D0 illustrated in FIG. 4A is just for an illustration purpose, and the actual frequency of the PWM reference signal P0 is far greater than that.

Figure 4B:
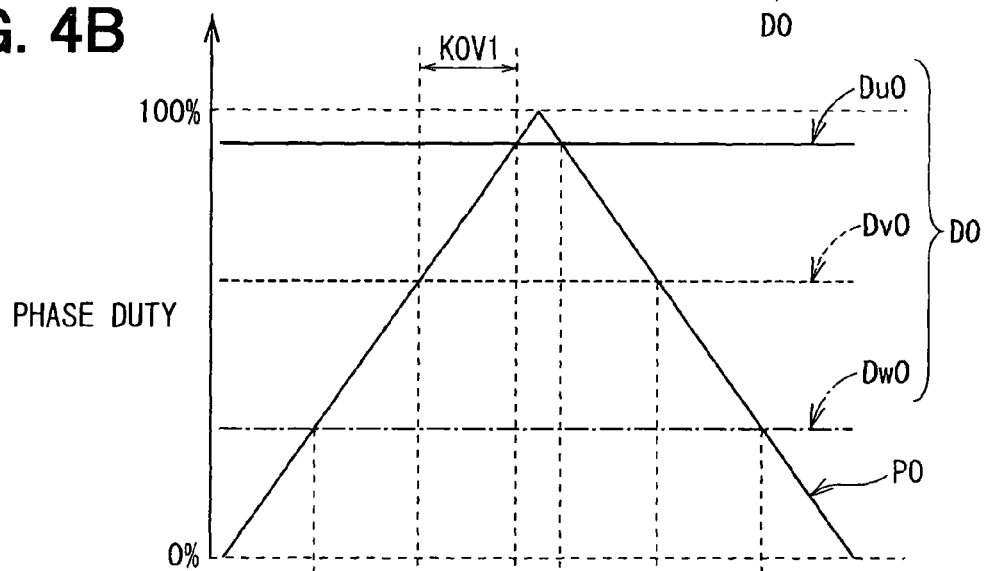
Figure 4C:
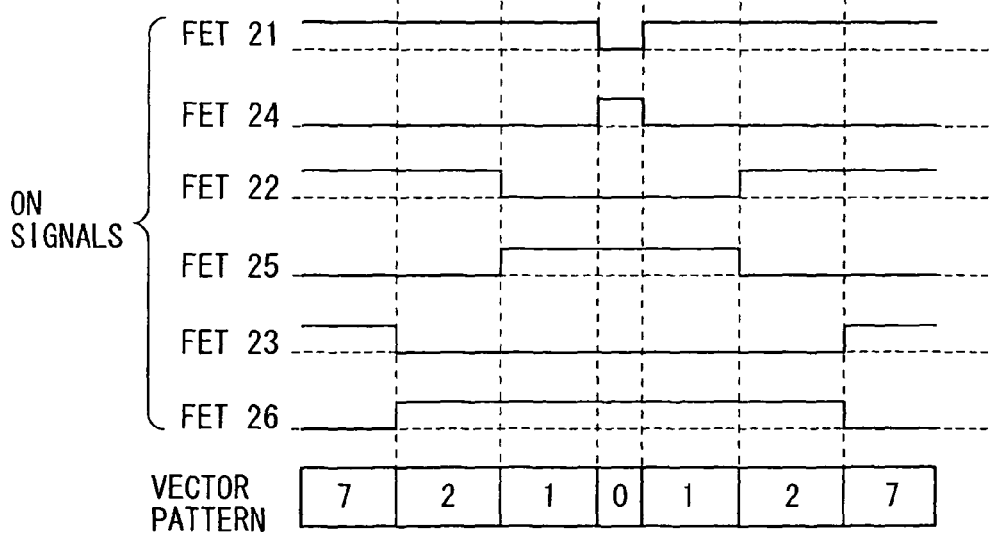

FIG. 4B is an enlarged diagram of a period K0 shown in FIG. 4A. It illustrates a small-large relationship between the PWM reference signal P0 and the duty instruction signal D0, which is actually the sine wave signal.

In the PWM control, each of the phase duties Du0, Dv0, Dw0 is compared with the PWM reference signal P0, and the on/off signals of FETs 21 to 26 are generated. The method adopted in the present embodiment turns off the upper FETs 21 to 23 in a section where the PWM reference signal P0 is greater than each of the phase duties Du0, Dv0, Dw0, and turns on corresponding lower FETs 24 to 26 in the same section. Further, in a section where the PWM reference signal P0 is smaller than each of the phase duties Du0, Dv0, Dw0, the upper FETs 21 to 23 are turned on, and corresponding lower FETs 24 to 26 are turned off. Thus, the on/off of the upper FETs 21 to 23 and corresponding lower FETs 24 to 26 is reversed.

More specifically, for example, in a section K0V1, the PWM reference signal P0 is positioned below the U-phase duty Du0 indicated by a solid line, and is positioned above the V-phase duty Dv0 indicated by a broken line and the W-phase duty Dw0 indicated by a dashed line. Therefore, for the U-phase, the upper FET 21 is turned on, and the lower FET 24 is turned off. Likewise, for the V-phase and the W-phase, the upper FET 22 and the upper FET 23 are turned off, and the lower FET 25 and the lower FET 26 are turned on.

The pattern of the voltage vector show how three of six FETs 21 to 26 are tuned on, and, as shown in FIG. 5, such turn-on and turn-off are represented by eight voltage vectors of V0 to V7. The voltage vector V0 has all of the lower FETs 24 to 26 being turned on. Further, in the voltage vector V7, all of the upper FETs 21 to 23 are turned on. Therefore, the voltage vectors V0, V7 correspond to a zero voltage vector, where no voltage is applied to the first winding wire group 18. On the other hand, the voltage vectors V1 to V6 correspond to an effective voltage vector, where the voltage is applied to the first winding wire group 18.

Figure 7A:
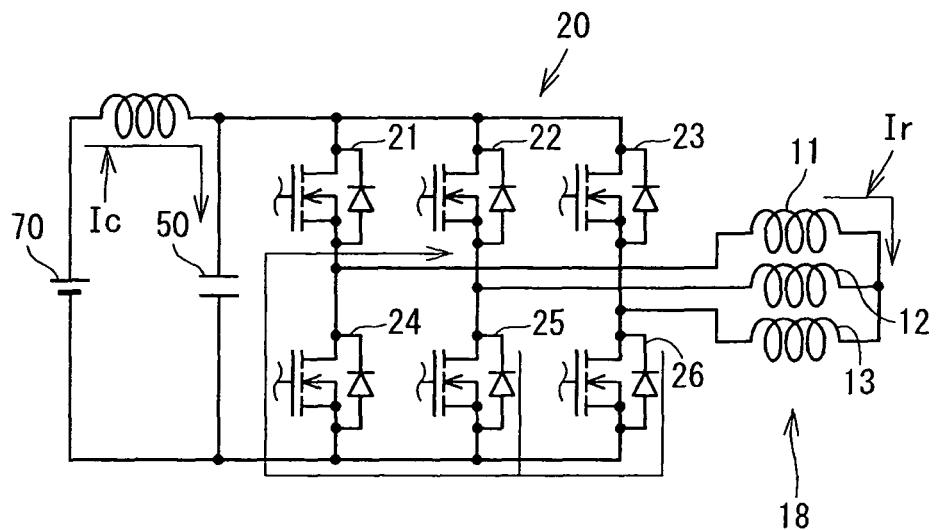
FIGS. 7A and 7B are schematic diagrams of the capacitor electric current at a time of charging and discharging.
Figure 7B:
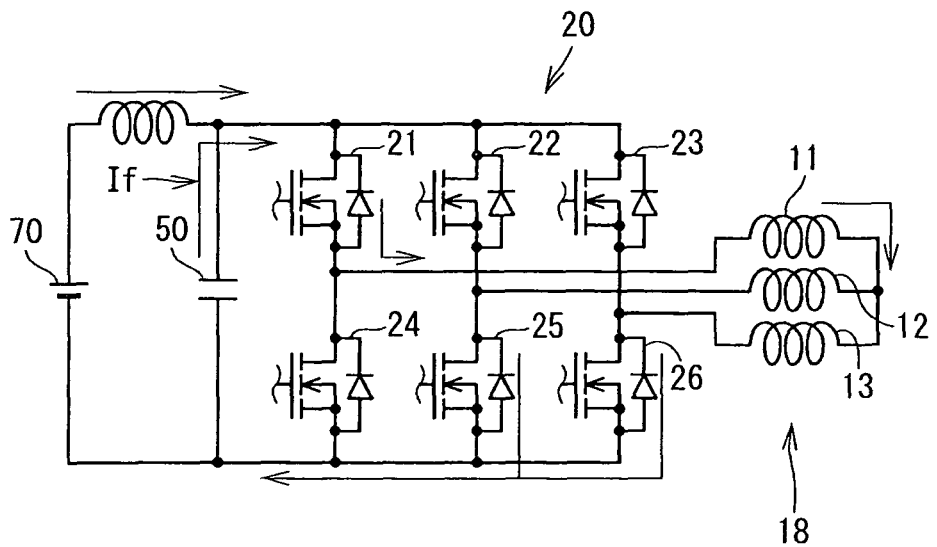

The electric current flowing to the capacitor 50 when the PWM control is performed is explained below with reference to FIGS. 6, 7A and 7B. The schematic diagram in FIG. 7A shows only the first system, and components such as the second system and the electric current detection unit 40 are omitted from illustration.

As shown in FIG. 6, when the PWM reference signal P0 indicated by (a) is greater than each of the phase duties Du0, Dv0, Dw0, corresponding upper FETs 21 to 23 are turned off as indicated by (c), and corresponding lower FETs 24 to 26 are turned on as indicated by (b). Further, when the PWM reference signal P0 is smaller than each of the phase duties Du0, Dv0, Dw0, corresponding upper FETs 21 to 23 are turned on as indicated by (c), and corresponding lower FETs 24 to 26 are turned off as indicated by (b).

When the zero voltage vector, where all of the FETs 21 to 23 or all of the lower FETs 24 to 26 are turned on is generated, the capacitor 50 is charged (C) by the electric current flowing from the battery 70 to the capacitor 50 as indicated by (d) and (e) in FIG. 6. For example, as shown in FIG. 7A, when the lower FETs 24 to 26 are turned on, the electric current from the battery 70 does not flow toward the first inverter unit 20, and a regenerated electric current Ir flows to the first winding wire group 18 in a closed loop. Further, the electric current I from the battery 70 flows into the capacitor 50 as indicated by Ic, and the capacitor 50 is charged.

Further, when the effective voltage vector where the first phase or the second phase is turned on from among the upper FETs 21 to 23 is generated, the electric current flows from the capacitor 50 toward the first inverter unit 20, for discharging. For example, as shown in FIG. 7B, the electric current from the battery 70 flows toward the first inverter unit 20 when the upper FET 21 and the lower FETs 25, 26 are turned on. Further, the electric current flows from the capacitor 50 toward the first inverter unit 20 as indicated by If, and the capacitor 50 is discharged (D).

Referring again to FIG. 6 for the explanation of the small-large relationship of the duty instruction signal D0 relative to the PWM reference signal P0 and the charge-discharge state of the capacitor 50, the capacitor 50 is charged during a period where the PWM reference signal P0 is greater than the duty instruction signal D0 of all phases, or during a period where the PWM reference signal P0 is smaller than the duty instruction signal D0 of all phases. On the other hand, during a period where the PWM reference signal P0 is positioned between the greatest duty and the smallest duty, the capacitor 50 is discharged. Therefore, the charge and discharge of the capacitor 50 are repeated in one cycle of the PWM control as indicated by (d) of FIG. 6. Thus, the capacitor electric current makes pulses as indicated by (e) in FIG. 6. The capacitor electric current in a charge period and in a discharge period is respectively reversed, and the capacitor electric current of the charge period is smaller than the capacitor electric current of the discharge period.

Figure 8A:
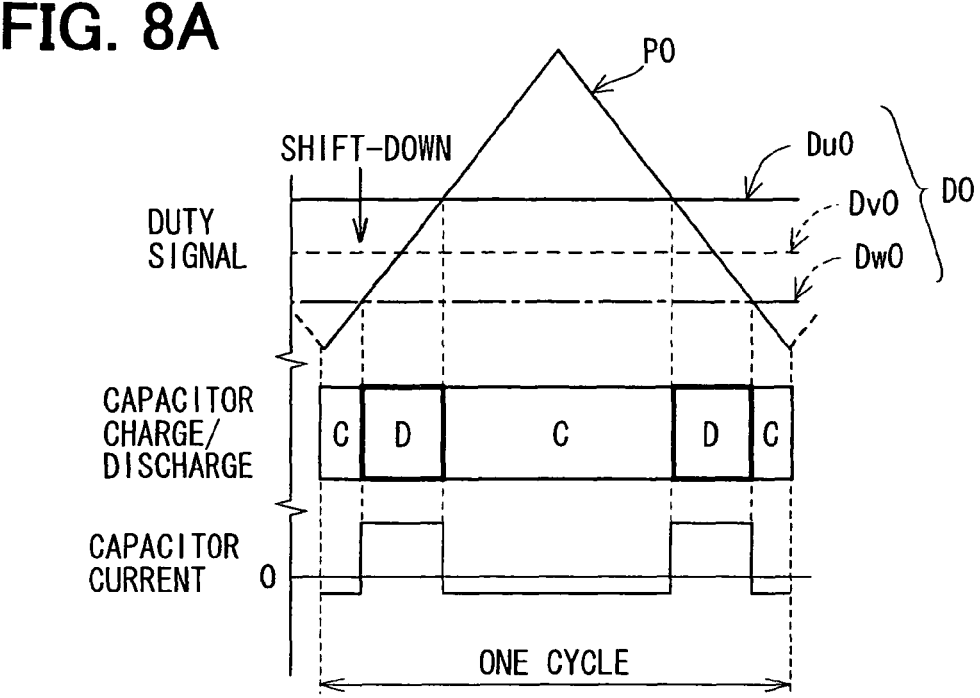
FIGS. 8A and 8B are time charts of the capacitor electric current when a duty instruction signal is shifted.
Figure 8B:
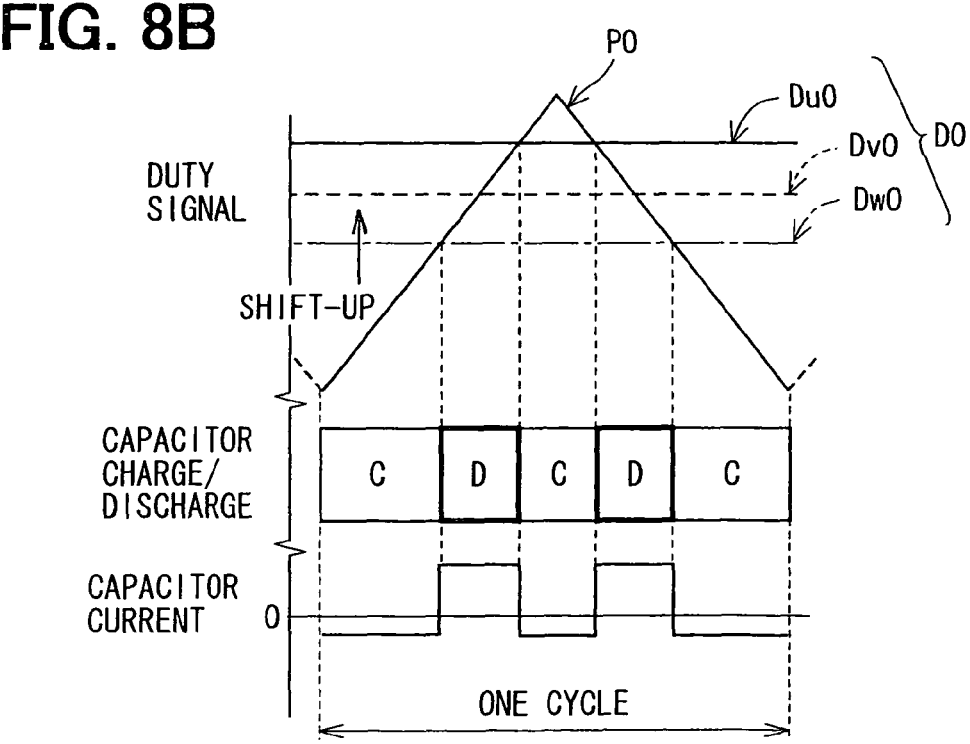

FIG. 8A shows a voltage vector and a capacitor electric current when the duty instruction signal D0 is shifted down to a lower position, toward the low duty side relative to the PWM reference signal P0. Further, FIG. 8B shows a voltage vector and a capacitor electric current when the duty instruction signal D0 is shifted up to an upper position, toward the high duty side relative to the PWM reference signal P0.

By shifting the duty instruction signal D0 up and down in the above-described manner, the neutral point voltage that is an average of the voltages that are applied to the coils 11 to 13 in respective phases is manipulated. Further, even when the duty instruction signal D0 is shifted up and down, the voltage applied to the first winding wire group 18 does not change if a line voltage between different phases does not change.

When the duty instruction signal D0 is shifted down as shown in FIG. 8A, a charge period of the capacitor 50 on the mountain side of the PWM reference signal P0 becomes comparatively long, and a discharge period of the capacitor 50 is shifted toward a beginning and toward an ending of one cycle of the PWM control. On the other hand, when the duty instruction signal D0 is shifted up as shown in FIG. 8B, the charge period of the capacitor 50 on the mountain side of the PWM reference signal P0 becomes comparatively short, and a discharge period of the capacitor 50 is shifted toward a center of one cycle of the PWM control. Further, a charge period on the valley side of the PWM reference signal P0 becomes comparatively long.

As described above, generation timings of the effective voltage vector and the zero voltage vector can be changed by shifting the duty instruction signal D0 up and down to manipulate the neutral point voltage.

Further, in the electric power converter having two systems of inverter units 20, 30, by manipulating the neutral point voltage of each of the first duty instruction signal and the second duty instruction signal, a charge discharge timing between each of the inverter units 20, 30 and the capacitor 50 can be adjusted. For example, by performing a control that enables the charging of the capacitor 50 in the second system from the battery 70 (cf. FIG. 7A), when an electric current is discharged from the capacitor 50 to the first inverter unit 20 in the first system (cf. FIG. 7B), the ripple electric current of the capacitor 50 is reduced.

In the first embodiment, in addition to such manipulation of the neutral point voltage, a combination of the following two processes, a process to phase-shift the post-modulation first duty instruction signal D11 and the post-modulation second duty instruction signal D12 in the inverter units 20, 30 of the two systems and a process to phase-shift the first PWM reference signal P11 and the second PWM reference signal P12 is devised to further reduce the ripple electric current of the capacitor 50 in a secure manner.

The PWM control in the first embodiment is described with reference to FIGS. 9A to 12B.

In the first embodiment, the modulation processor 653 performs the flatbed two-phase modulation process for the first duty instruction signal, and performs the flattop two-phase modulation process for the second duty instruction signal.

Figure 9A:
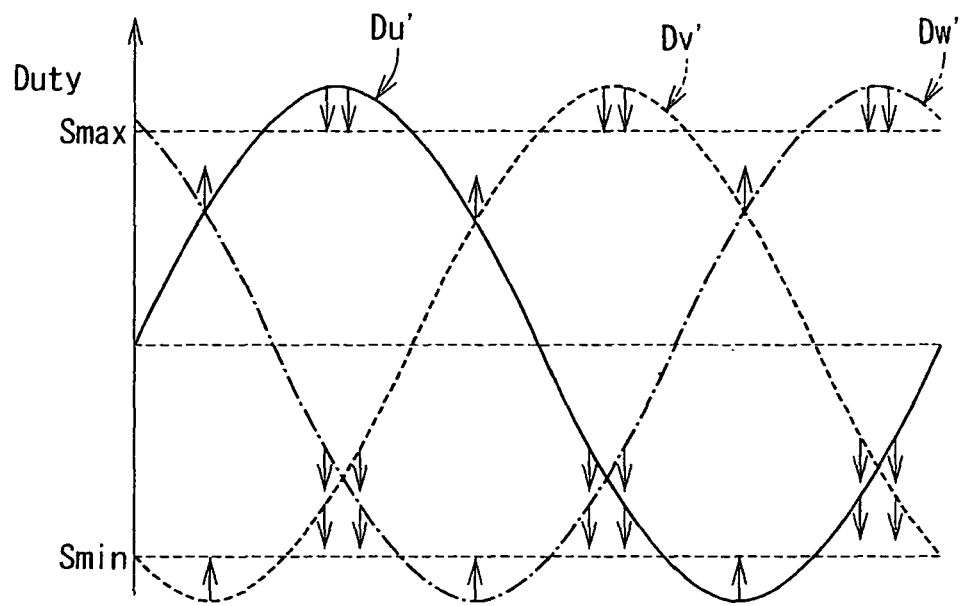
FIGS. 9A and 9B are time charts of flatbed two-phase modulation process in the first embodiment of the present invention.
Figure 9B:
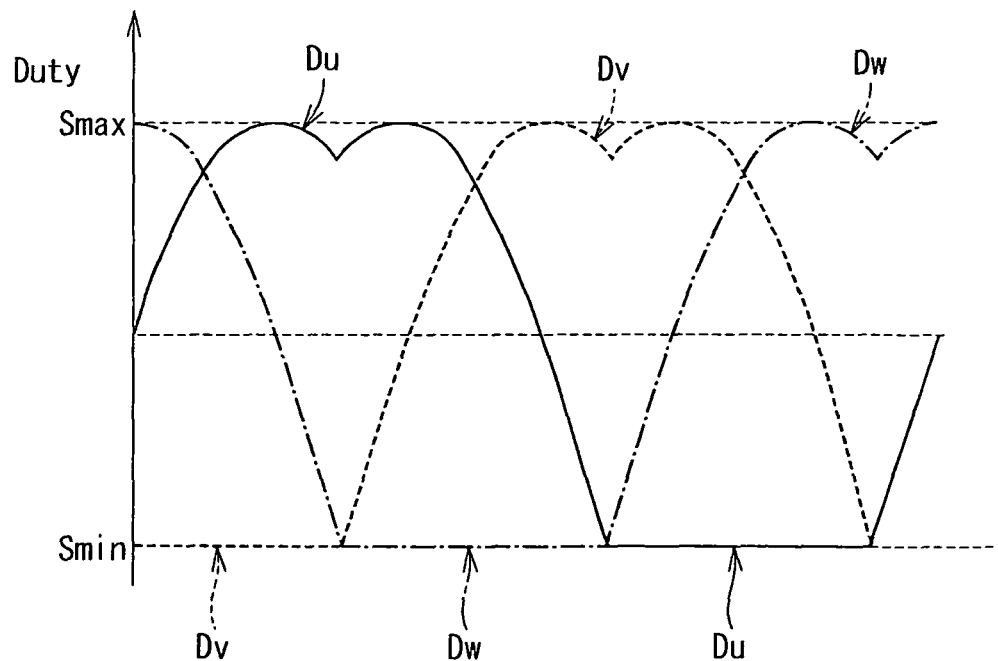

At first, the flatbed two-phase modulation process is described with reference to FIGS. 9A and 9B. As shown in FIG. 9A, base sine waves, which serve as reference, are modulated by subtracting, from all phases, a difference between the duty of the smallest phase and a minimum reference value Smin (i.e., a difference calculated by subtracting a minimum reference value Smin from the duty of the smallest phase), so that the duty of the smallest phase becomes the minimum reference value Smin. FIG. 9B shows a waveform that has undergone the flatbed two-phase modulation process.

Figure 10A:
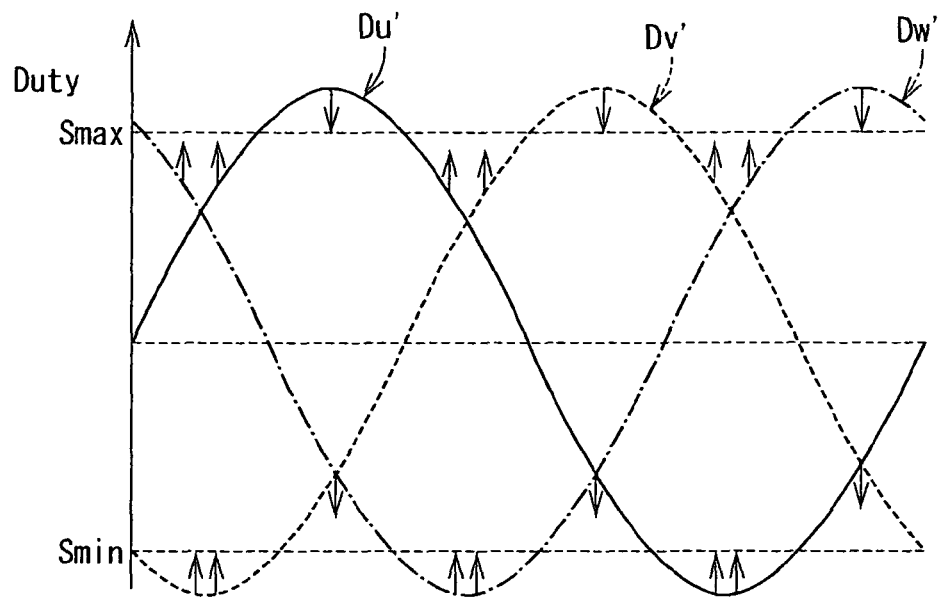
FIGS. 10A and 10B are time charts of flattop two-phase modulation process in the first embodiment of the present invention.
Figure 10B:
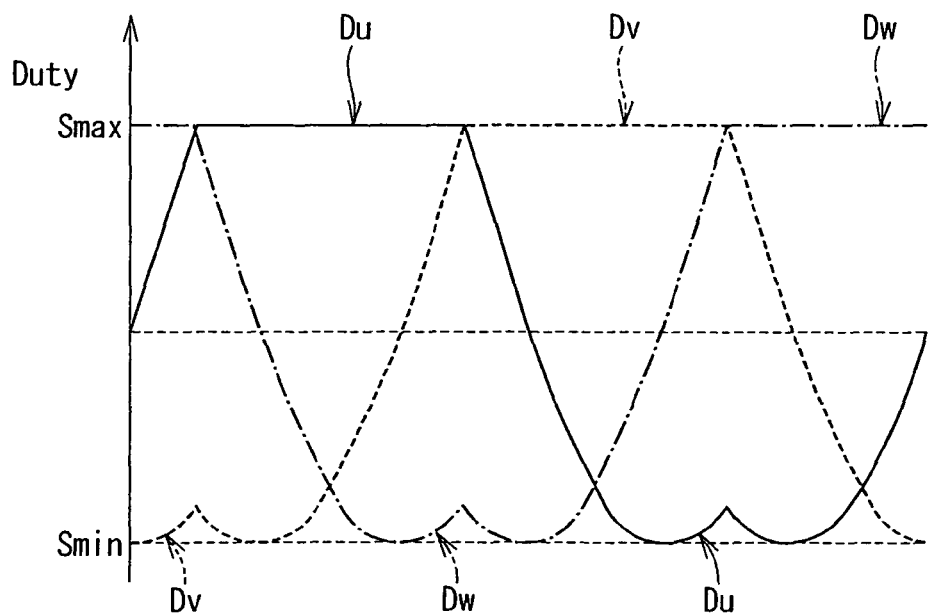

Further, the flattop two-phase modulation process is described with reference to FIGS. 10A and 10B. As shown in FIG. 10A, base sine waves are modulated by subtracting, from all phases, a difference between the duty of the greatest phase and a maximum reference value Smax (i.e., a difference calculated by subtracting a maximum reference value Smax from the duty of the greatest phase), so that the duty of the greatest phase becomes the maximum reference value Smax. FIG. 10B shows a waveform that has undergone the flattop two-phase modulation process.

In the following description of the PWM control in the first embodiment, the last two digits of a sign of each signal in the first system (#1) is designated as 11, and the last two digits of a sign of each signal in the second system (#2) is designated as 12.

Figure 11A:
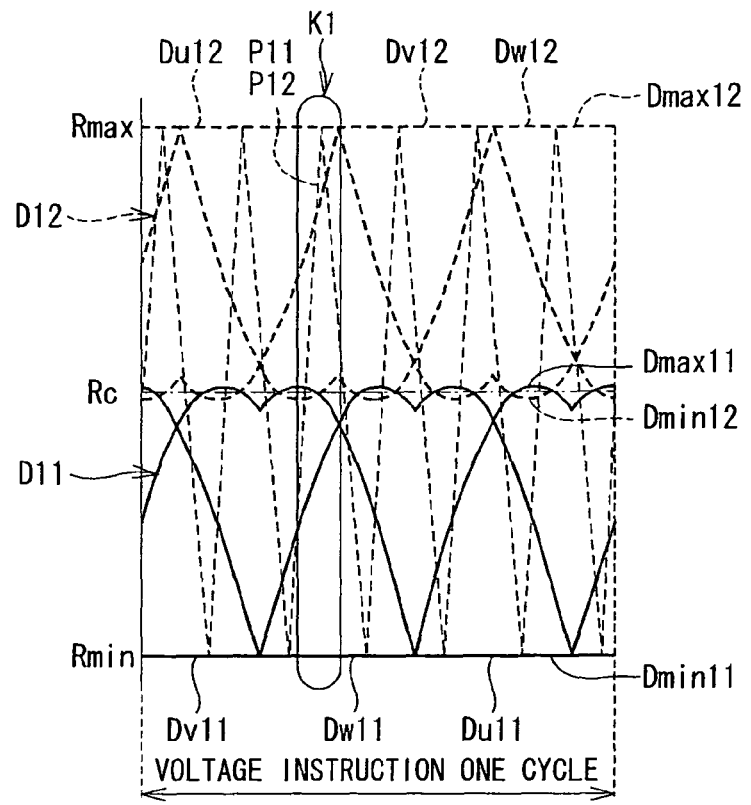
FIGS. 11A and 11B are time charts of the capacitor electric current as a comparative example against the first embodiment, in which the duty instruction signals in two systems have the same phase.
Figure 11B:
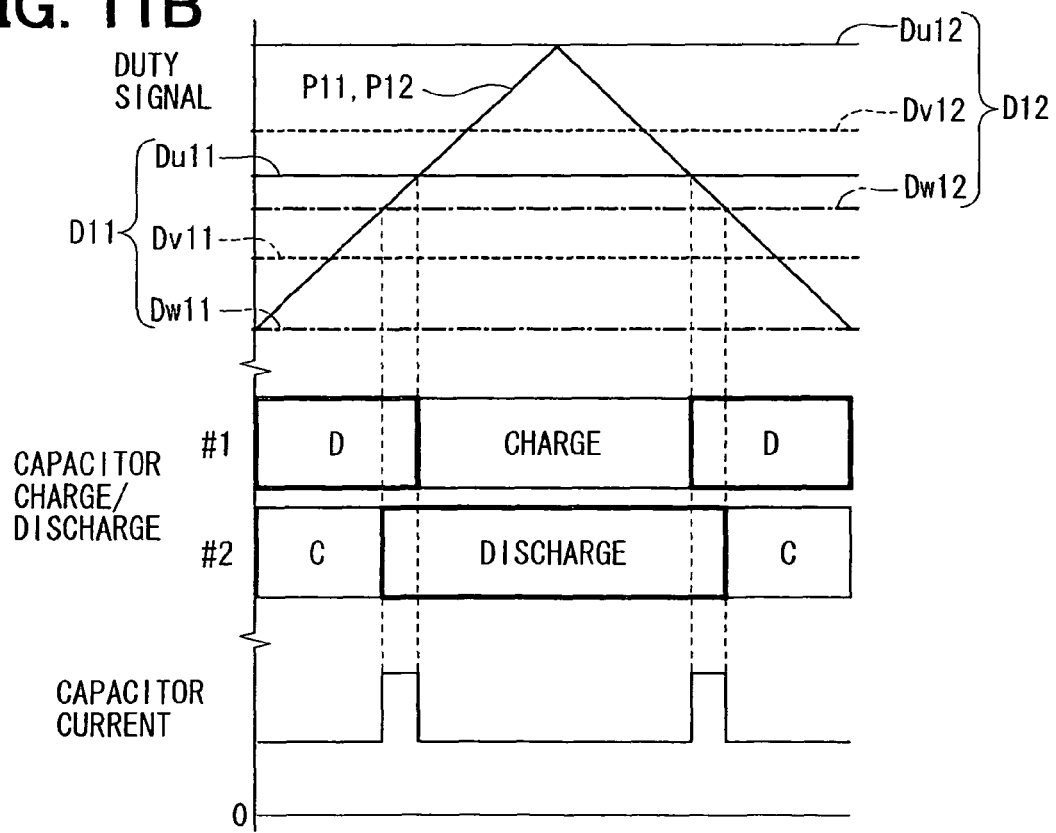

FIGS. 11A and 11B show a comparative example against the first embodiment, in which the first duty instruction signal D11 that has undergone the flatbed two-phase modulation process and the second duty instruction signal D12 that has undergone the flattop two-phase modulation process have the same phase (i.e., in phase).

The minimum value Dmin11 in the first duty instruction-signal D11 is substantially equal to the minimum value Rmin of an allowable duty output range, and the maximum value Dmax11 in the first duty instruction signal D11 is only slightly greater than a center output value Rc. The maximum value Dmax12 of the second duty instruction signal D12 is substantially equal to the maximum value Rmax of an allowable duty output range, and the minimum value Dmin12 of the second duty instruction signal D12 is only slightly smaller than a center output value Rc. The maximum value Dmax11 of the first duty instruction signal D11 and the minimum value Dmin12 of the second duty instruction signal D12 are substantially symmetrical relative to the center output value Rc. Further, a timing when the first duty instruction signal D11 takes the maximum value Dmax11 and a timing when the second duty instruction signal D12 takes the minimum value Dmim12 overlap at every 60°, thus the first duty instruction signal D11 and the second duty instruction signal D12 intersect with each other.

FIG. 11B is an enlarged diagram of a period K1 in FIG. 11A, for illustration purpose.

As shown in FIG. 11B, the greatest U-phase duty Du11 in the first duty instruction signal D11 is greater than the smallest W-phase duty Dw12 in the second duty instruction signal D12. Therefore, when the first PWM reference signal P11 and the second PWM reference signal P12 are controlled to have the same phase, the discharge period of the second system, which is a generation period of the effective voltage vector of the second PWM reference signal P12, becomes longer than the charge period of the first system, which is a generation period of the zero voltage vector V0 on the mountain side of the first PWM reference signal P11. Therefore, the capacitor discharge period of the first system and the capacitor discharge period of the second system overlap with each other twice in one cycle of the voltage instruction, thereby causing an increase of the ripple electric current.

In the first embodiment, the electric current detectors 41 to 46 are disposed at the above-described positions, the minimum value Rmin of the allowable duty output range can be set to 0%, and the maximum value Rmax can be set to 100%. In such a case, the center output value Rc which is the center value of the duty range is set to 50%.

The maximum value Rmax and the minimum value Rmin of the allowable duty output range are a predetermined upper limit value and a predetermined lower limit value.

Further, the first PWM reference signal P11 regarding driving of the first inverter unit 20 and the second PWM reference signal P12 regarding driving of the second inverter unit 30 are chopping wave signals with a frequency of 20 kHz, that is, with a cycle time of 50 µs.

Further, similarly to the explanation of FIG. 4A, the number of the PWM reference signals P11, P12 in one cycle of the duty instruction signals D11, D12 in FIG. 11A is just for illustration, and the actual frequencies of the signals P11, P12 are greater than that. The same applies to each of FIGS. 12A to 16A, 19A, and 20A.

Figure 12A:
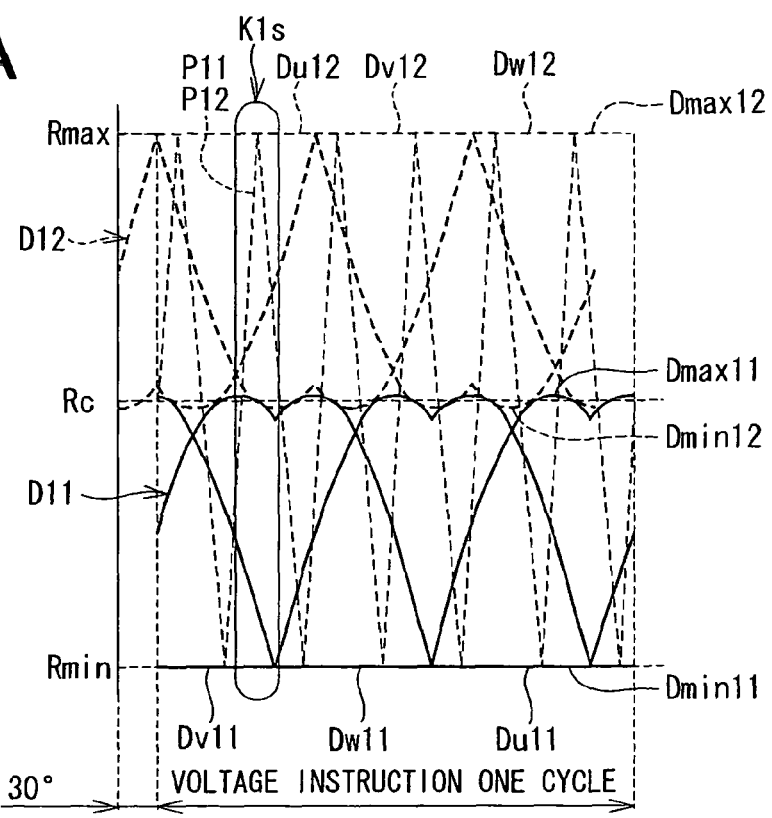
FIGS. 12A and 12B are time charts of the capacitor electric current of the first embodiment, in which the duty instruction signals in two systems have the phase shift of 30 degrees.
Figure 12B:
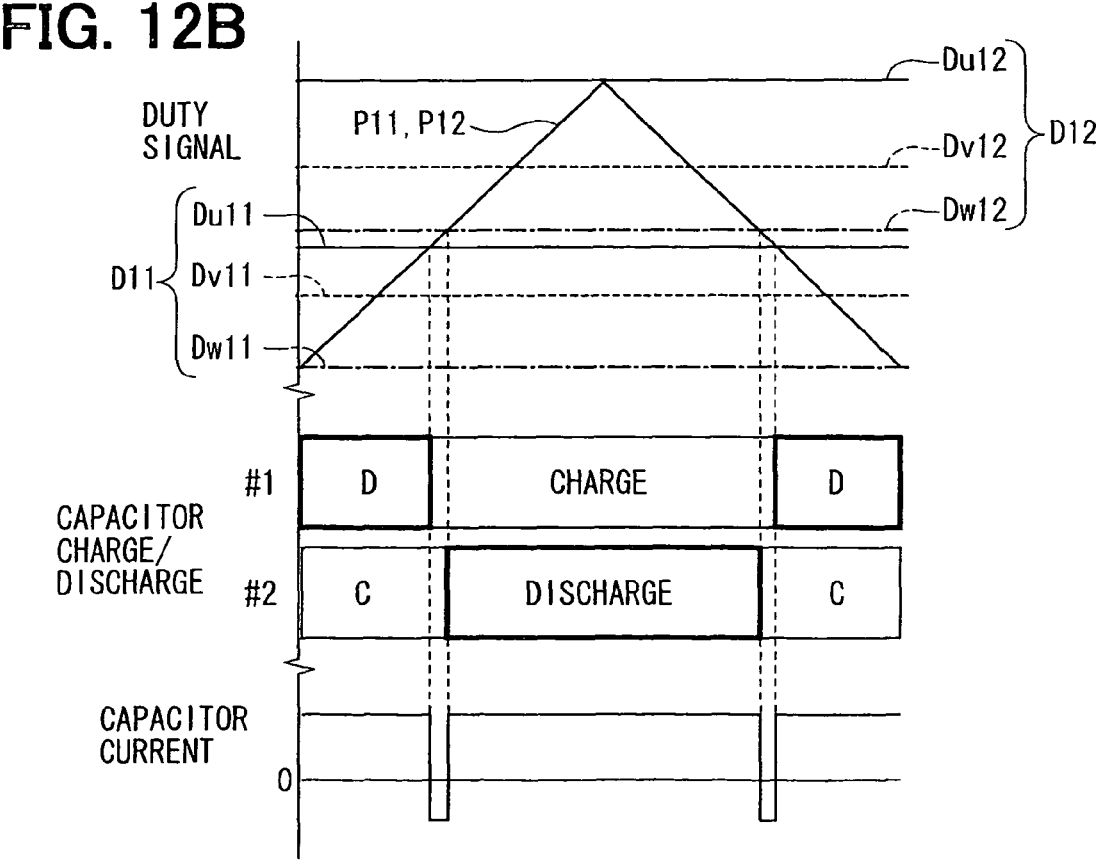

FIGS. 12A and 12B show illustrations of the phase advancement by 30°. That is, the phase of the second duty instruction signal D12 is advanced by 30° from the phase of the first duty instruction signal D11. In such case, a timing when the second duty instruction signal D12 takes the minimum value Dmin12 and a timing when the first duty instruction signal D11 takes the maximum value Dmax11 are phase-shifted by 30° from each other. That is, the second duty instruction signal D12 takes the minimum value Dmin12 right in the middle (i.e., at a right center) of two timings when the first duty instruction signal D11 takes the maximum value Dmax11 at every 60°.

FIG. 12B is an enlarged diagram of a period K1s in FIG. 12A, for the illustration purpose. The U-phase duty Du11 which is the greatest in the first duty instruction signal D11 is smaller than the W-phase duty Dw12 which is the smallest in the second duty instruction signal D12 as shown in FIG. 12B.

Therefore, when the first PWM reference signal P11 and the second PWM reference signal P12 are controlled to have the same phase, the charge period of the first system, which is a generation period of the zero voltage vector V0 on the mountain side of the first PWM reference signal P11, becomes longer than the discharge period of the second system, which is a generation period of the effective voltage vector of the second PWM reference signal P12. Therefore, capacitor discharge periods of the first and second systems have no overlap. Thus, the ripple electric current is reduced.

(Advantages of the First Embodiment)

The advantageous effects of the electric power converter in the first embodiment is described below.

(1) When the maximum value Dmax11 of the first duty instruction signal D11, which has undergone the flatbed two-phase modulation process, is smaller than the center output value Rc and the minimum value Dmin12 of the second duty instruction signal D12, which has undergone the flattop two-phase modulation process, is greater than the center output value Rc, both duty instruction signals D11, D12 do not intersect with each other even in case that both duty instruction signals D11, D12 have the same phase. Therefore, the increase of the ripple electric current due to the overlapping of the two discharge periods will not be caused.

However, if the maximum value Dmax11 of the first duty instruction signal D11 is greater than the center output value Rc and the minimum value Dmin12 of the second duty instruction signal D12 is smaller than the center output value Rc, the overlapping of the two discharge periods occurs in case that both duty instruction signals D11, D12 have the same phase.

Therefore, if the maximum value Dmax11 of the first duty instruction signal D11 and the minimum value Dmin12 of the second duty instruction signal D12 are within a predetermined range of the center output value Rc, the overlapping of the two discharge periods is avoided by shifting the phase of the second duty instruction signal D12 by 30° from the phase of the first duty instruction signal D11. Therefore, the ripple electric current of the capacitor 50 is reduced. As a result, the generation of the noise and/or the heat generation in the capacitor are prevented, and the controllability of the electric current from the inverter is preferably maintained.

(2) Because the first duty instruction signal D11 undergoes the flatbed two-phase modulation process and the second duty instruction signal D12 undergoes the flattop two-phase modulation process, the voltage utilization efficiency is improved.

(3) The motor 10 has twelve coils that are wound on the stator 85, and the rotor 80 has ten magnetic poles. Further, the coils 14, 15, 16 forming the second winding-wire group 19 are positioned to have an angular advancement of 30° in a clockwise direction relative to the coils 11, 12, 13 forming the first winding wire group 18. By employing such a simple configuration, the phase difference between the first duty instruction signal D11 and the second duty instruction signal D12 is set to 30°.

(4) Because the electric current detectors 41 to 46 are disposed between (a) the connection points between the upper FETs 21 to 23, 31 to 33 and the lower FETs 24 to 26, 34 to 36, and (b) corresponding winding wires 11 to 13, 14 to 16, the center output value Rc is set to 50%. Therefore, the switching on/off timings of FETs 21 to 26, 31 to 36 under control of the inverter units 20, are synchronized, and the calculation load of the control unit 60 is reduced.

(5) Because no phase difference is set between the first PWM reference signal P11 and the second PWM reference signal P12, load of the control unit 60 is reduced.

The second to fifth embodiments of the present invention have basically the same circuit configuration as the first embodiment but differ from the first embodiment in respective processes performed by the control unit 60. Therefore, only different portions are described below.

(Second Embodiment)

The PWM control in the second embodiment is described with reference to FIGS. 13A to 14B. In the second embodiment, the modulation processor 653 performs the flatbed two-phase modulation process (cf. FIG. 9).

Figure 13A:
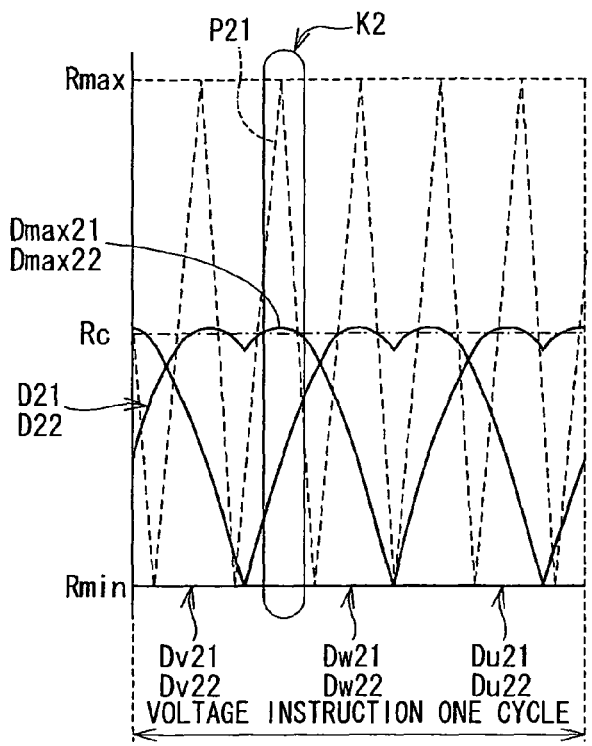
FIGS. 13A and 13B are time charts of the capacitor electric current as a comparative example against a second embodiment, in which the duty instruction signals in two systems have the same phase.
Figure 13B:
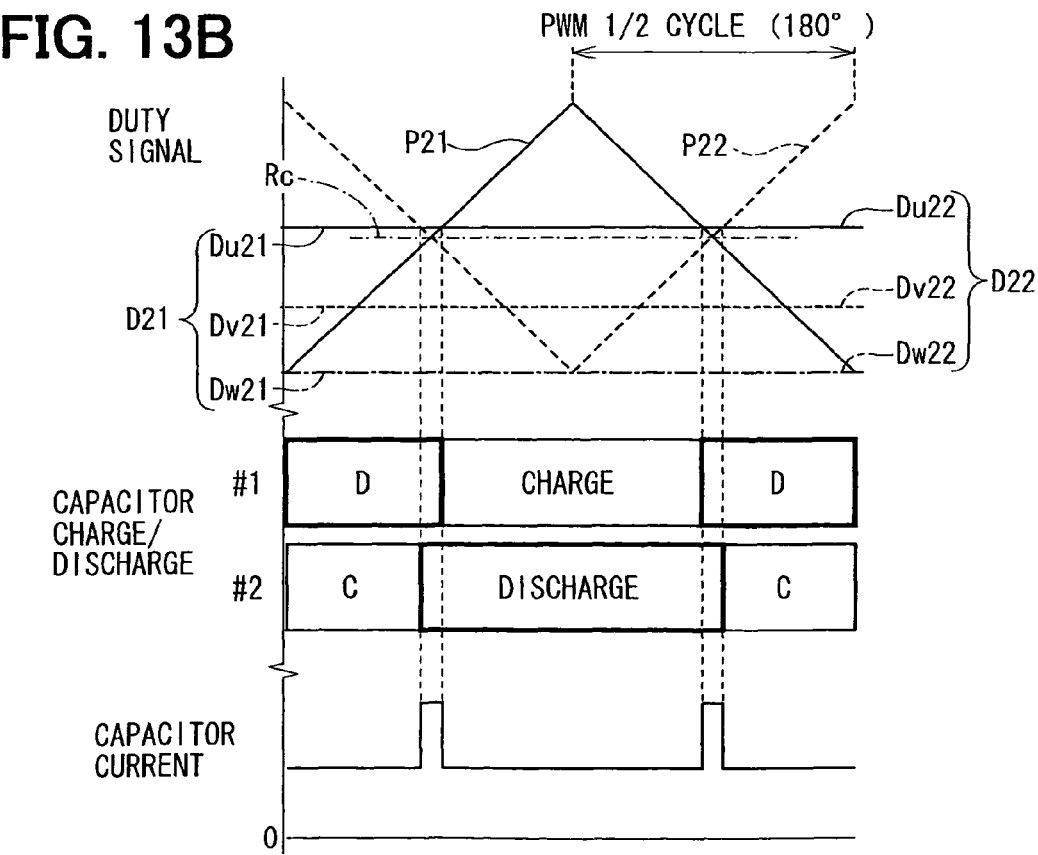

FIGS. 13A and 13B illustratively show as a comparative example against the second embodiment, in which the first duty instruction signal D21 and the second duty instruction signal D22 respectively having undergone the flatbed two-phase modulation process have the same phase.

The first duty instruction signal D21 and the second duty instruction signal D22 have the same amplitude and have the same phase, and the minimum values Dmin21, Dmin22 are substantially equal to the minimum value Rmin of the allowable duty output range, and the maximum values Dmax21, Dmax22 are only slightly greater than the center output value Rc. Further, a timing when the first duty instruction signal D21 takes the maximum value Dmax21 and a timing when the second duty instruction signal D22 takes the maximum value Dmax22 overlap at every 60°.

FIG. 13B is an enlarged diagram of a period K2 in FIG. 13A, for the illustration purpose.

The greatest U-phase duty Du21 in the first duty instruction signal D21 is substantially the same as the greatest U-phase duty Du22 in the second duty instruction signal D22 as shown in FIG. 13B.

Therefore, when the phase of the second PWM reference signal P22 is shifted from the phase of the first PWM reference signal P21 by ½ cycle (180°), the discharge period of the second system, which is a generation period of the effective voltage vector of the second PWM reference signal P12, becomes longer than the charge period of the first system, which is a generation period of the zero voltage vector V0 on the mountain side of the first PWM reference signal P11. Therefore, a capacitor discharge period of the first system and a capacitor discharge period of the second system overlap with each other twice in one cycle of the voltage instruction, thereby causing an increase of the ripple electric current.

Figure 14A:
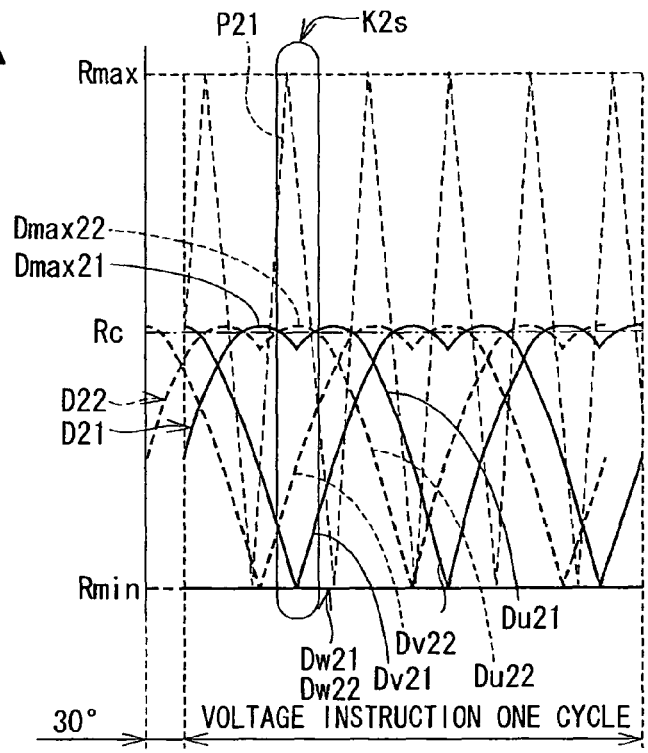
FIGS. 14A and 14B are time charts of the capacitor electric current in the second embodiment, in which the duty instruction signals in two systems have the phase shift of 30 degrees.
Figure 14B:
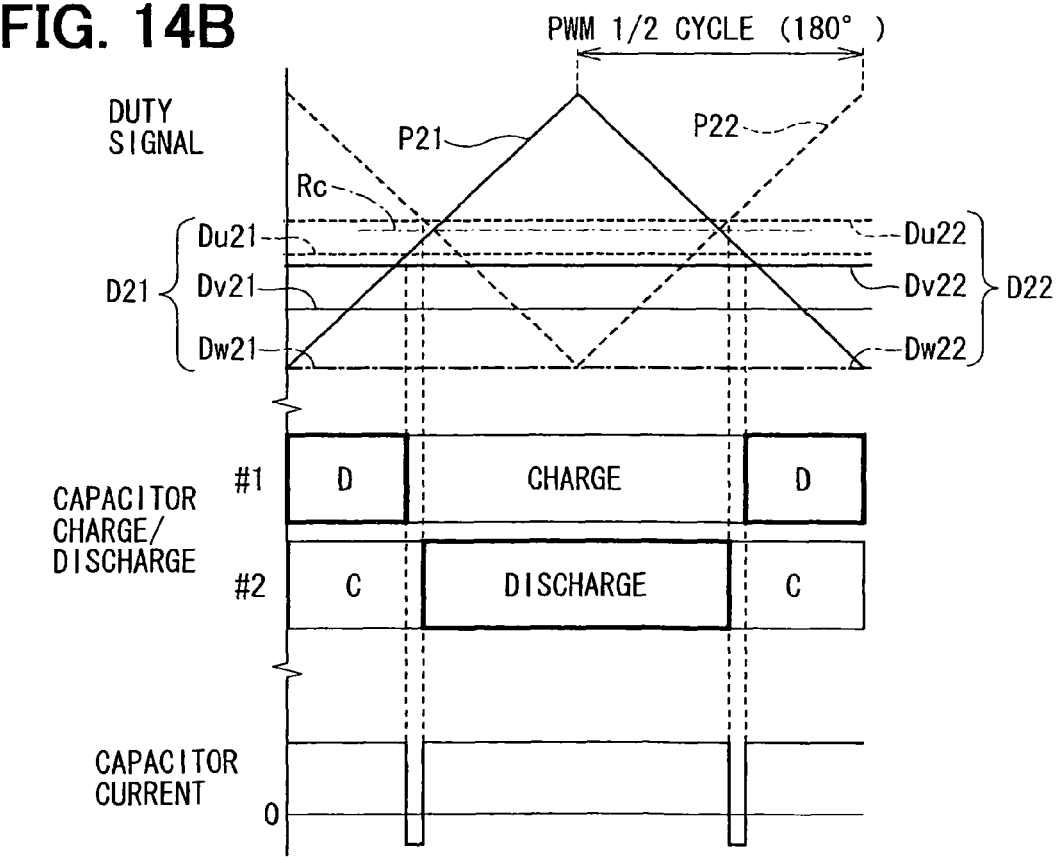

FIGS. 14A and 14B show illustrations of the phase advancement by 30°. That is, the phase of the second duty instruction signal D22 is advanced by 30° from the phase of the first duty instruction signal D21. In such case, a timing when the first duty instruction signal D21 takes the maximum value Dmax21 and a timing when the second duty instruction signal D22 takes the minimum value Dmin22 are phase-shifted by 30° from each other. That is, the second duty instruction signal D22 takes the minimum value Dmin22 right in the middle (i.e., a center) of two timings when the first duty instruction signal D21 takes the maximum value Dmax21 at every 60°.

FIG. 14B is an enlarged diagram of a period K2s in FIG. 14A, for the illustration purpose.

The greatest U-phase duty Du21 in first duty instruction signal D21 is smaller than the greatest U-phase duty Du22 in the second duty instruction signal D22 as shown in FIG. 14B. Further, the difference between the center output value Rc and the U-phase duty Du21 is greater than the difference between the U-phase duty Du22 and the center output value Rc.

Therefore, when the phase of the second PWM reference signal P22 is shifted by ½ cycle from the phase of the first PWM reference signal P21, the charge period of the first system, which is a generation period of the zero voltage vector V0 on the mountain side of the first PWM reference signal P21, becomes longer than the discharge period of the second system, which is a generation period of the effective voltage vector of the second PWM reference signal P22. Therefore, capacitor discharge periods of the first and second systems have no overlap. Thus, the ripple electric current is reduced.

(Advantages of the Second Embodiment)

The electric power converter in the second embodiment achieves the following advantageous effects (1) and (2), which correspond to the advantageous effects (1) and (2) of the first embodiment. Further, the advantageous effects (3) and (4) of the first embodiment are shared with the second embodiment.

(1) When both of the maximum values Dmax21 and Dmax22 of the duty instruction signals D21, D22, which have undergone the flatbed two-phase modulation process, are smaller than the center output value Rc, the effective voltage vector generation period of the first duty instruction signal D21 and the effective voltage vector generation period of the second duty instruction signal D22 do not overlap with each other when the phase of the second PWM reference signal P22 is shifted by ½ cycle of the PWM cycle from the first PWM reference signal P21, even if both duty instruction signals D21, D22 have the same amplitude and have the same phase. Therefore, a problematic increase of the ripple electric current due to the overlapping of the discharge periods will not be caused.

However, when the first duty instruction signal D21 and the second duty instruction signal D22 have the same phase in addition to a condition that both of the maximum values Dmax21 and Dmax22 of the duty instruction signals D21, D22 are greater than the center output value Rc, the overlapping of the discharge periods occurs if the phase of the second PWM reference signal P22 is shifted by ½ cycle from the first PWM reference signal P21.

Therefore, when both of the maximum values Dmax21, Dmax22 are within a predetermined range from the center output value Rc, the overlapping of the discharge periods is avoided by phase-shifting of the second duty instruction signal D22 from the phase of the first duty instruction signal D21 by 30°. Therefore, the ripple electric current of the capacitor is reduced.

(2) Because of the flatbed two-phase modulation process for the first duty instruction signal D21 and the second duty instruction signal D22, the voltage utilization efficiency is improved.

(Third Embodiment)

In the third embodiment, the modulation processor 653 performs the flatbed two-phase modulation process (cf. FIG. 10).

Figure 15A:
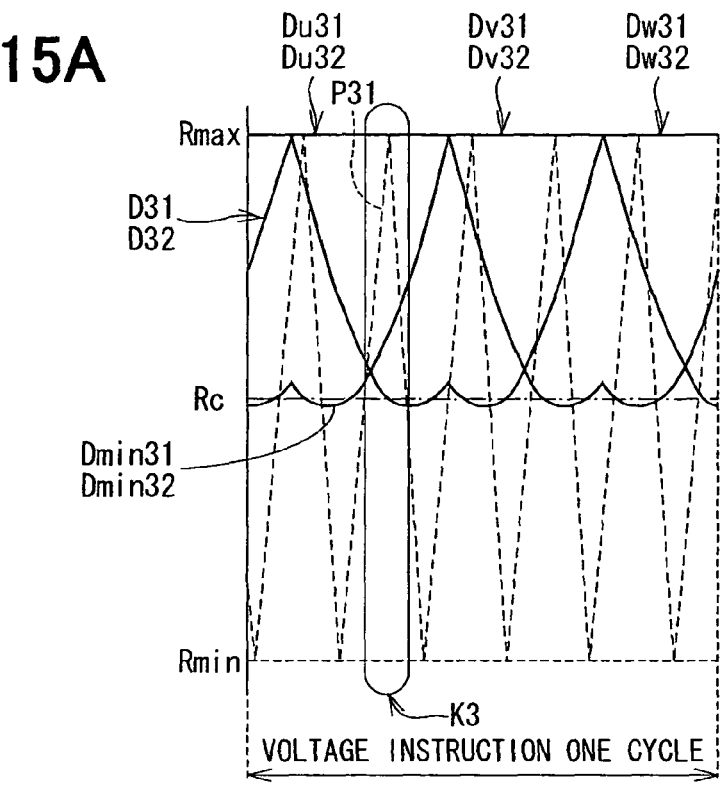
FIGS. 15A and 15B are time charts of the capacitor electric current as a comparative example against a third embodiment, in which the duty instruction signals in two systems have the same phase.
Figure 15B:
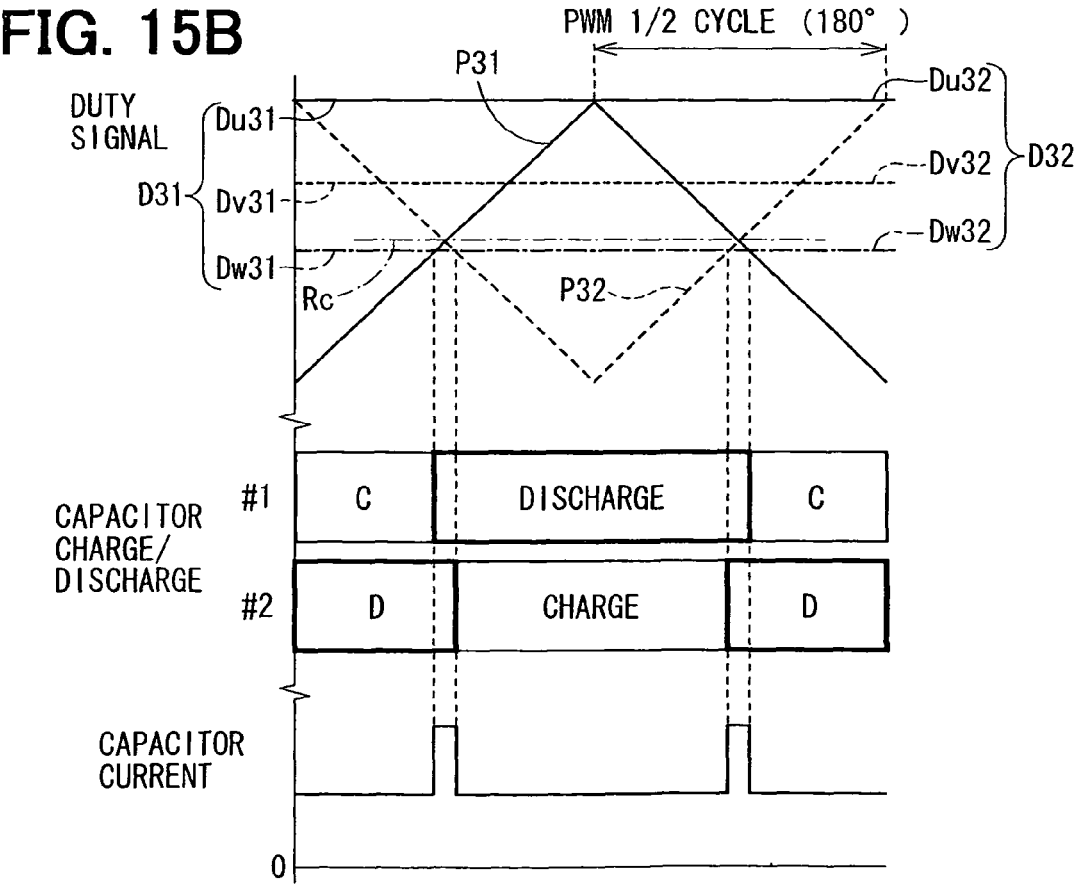

FIGS. 15A and 15B illustratively show as a comparative example against the third embodiment, in which the first duty instruction signal D31 and the second duty instruction signal D32 respectively having undergone the flattop two-phase modulation process have the same phase.

The first duty instruction signal D31 and the second duty instruction signal D32 have the same amplitude and have the same phase, and the minimum values Dmin31, Dmin32 are substantially equal to the maximum value Rmax of the allowable duty output range, and the minimum values Dmin31, Dmin32 are only slightly smaller than the center output value Rc. Further, a timing when the first duty instruction signal D31 takes the minimum value Dmin31 and a timing when the second duty instruction signal D32 takes the minimum value Dmin32 overlap at every 60°.

FIG. 15B is an enlarged diagram of a period K3 in FIG. 15A, for the illustration purpose.

The smallest W-phase duty Dw31 in the first duty instruction signal D31 is substantially the same as the smallest W-phase duty Dw32 in the second duty instruction signal D32 as shown in FIG. 15B.

Therefore, when the phase of the second PWM reference signal P32 is shifted from the phase of the first PWM reference signal P31 by ½ cycle of the PWM signal, the discharge period of the first system, which is a generation period of the effective voltage vector of the first PWM reference signal P31, becomes longer than the charge period of the second system, which is a generation period of the zero voltage vector V7 on the valley side of the second PWM reference signal P32. Therefore, a capacitor discharge period of the first system and a capacitor discharge period of the second system overlap with each other twice in one cycle of the voltage instruction, thereby causing an increase of the ripple electric current.

Figure 16A:
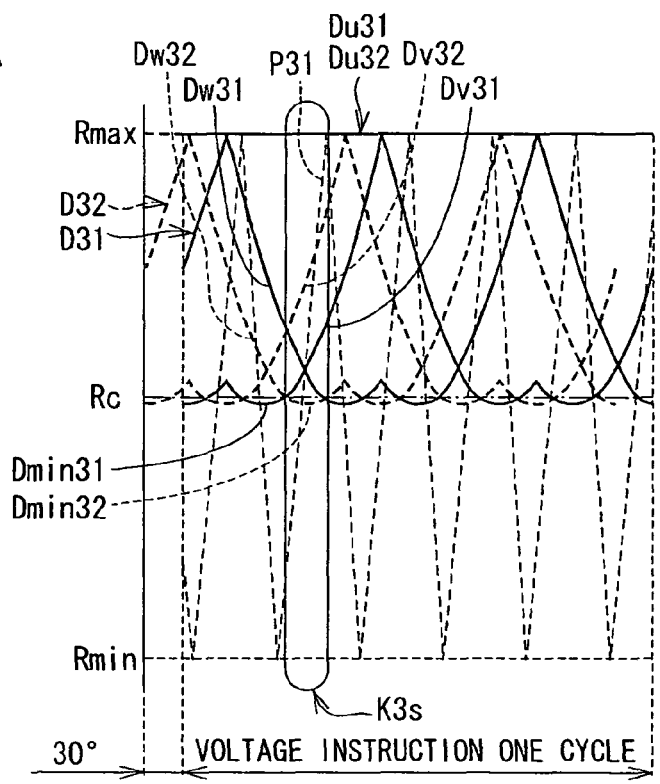
FIGS. 16A and 16B are time charts of the capacitor electric current in the third embodiment, in which the duty instruction signals in two systems have the phase shift of 30 degrees.
Figure 16B:
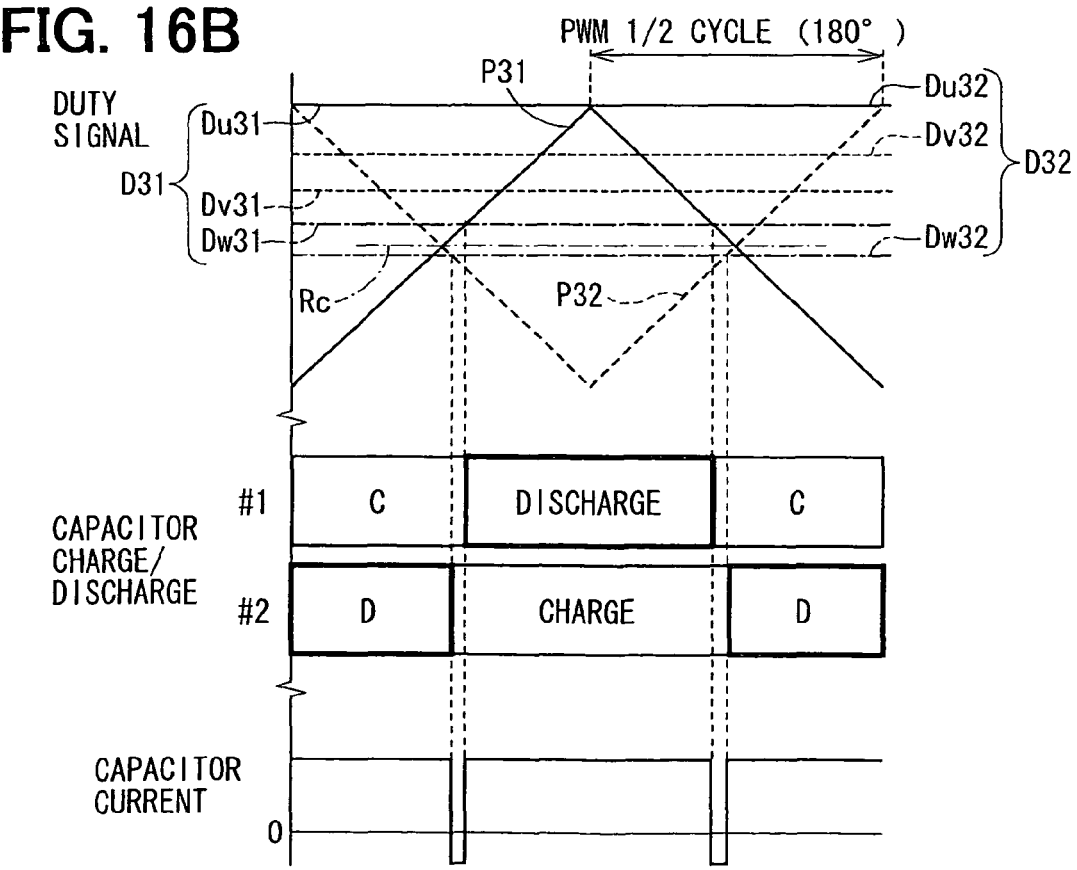

FIGS. 16A and 16B show illustrations of the phase advancement by 30°. That is, the phase of the second duty instruction signal D32 is advanced by 30° from the phase of the first duty instruction signal D31. In such case, a timing when the first duty instruction signal D31 takes the minimum value Dmin31 and a timing when the second duty instruction signal D32 takes the minimum value Dmin32 are phase-shifted by 30° from each other. That is, the second duty instruction signal D32 takes the minimum value Dmin32 right in the middle (i.e., at a center) of two timings when the first duty instruction signal D31 takes the minimum value Dmin31 at every 60°.

FIG. 16B is an enlarged diagram of a period K3s in FIG. 16A, for the illustration purpose.

The smallest W-phase duty Dw31 in first duty instruction signal D31 is smaller than the smallest W-phase duty Dw32 in the second duty instruction signal D32 as shown in FIG. 16B. Further, the difference between the center output value Rc and the W-phase duty Dw31 is greater than the difference between the W-phase duty Dw32 and the center output value Rc.

Therefore, when the phase of the second PWM reference signal P32 is shifted by ½ cycle from the phase of the first PWM reference signal P31, the charge period of the second system, which is a generation period of the zero voltage vector V7 on the valley side of the second PWM reference signal P32, becomes longer than the discharge period of the first system, which is a generation period of the effective voltage vector of the first PWM reference signal P31. Therefore, capacitor discharge periods of the first and second systems have no overlap. Thus, the ripple electric current is reduced.

(Advantages of the Third Embodiment)

The electric power converter in the third embodiment achieves the following advantageous effects (1) and (2), which correspond to the advantageous effects (1) and (2) of the first embodiment. Further, the advantageous effects (3) and (4) of the first embodiment are shared with the third embodiment.

(1) When both of the minimum values Dmin31 and Dmin32 of the duty instruction signals D31, D32, which have undergone the flattop two-phase modulation process, are greater than the center output value Rc, the effective voltage vector generation period of the first duty instruction signal D31 and the effective voltage vector generation period of the second duty instruction signal D32 do not overlap with each other when the phase of the second PWM reference signal P22 is shifted by ½ cycle from the first PWM reference signal P21, even if both duty instruction signals D31, D32 have the same amplitude and have the same phase. Therefore, a problematic increase of the ripple electric current due to the overlapping of the discharge periods will not be caused.

However, when the first duty instruction signal D31 and the second duty instruction signal D32 have the same phase in addition to a condition that both of the maximum values Dmin31 and Dmin32 of the duty instruction signals D31, D32 are smaller than the center output value Rc, the overlapping of the discharge periods occurs if the phase of the second PWM reference signal P32 is shifted by ½ cycle from the first PWM reference signal P31.

Therefore, when both of the minimum values Dmin31, Dmin32 are within a predetermined range from the center output value Rc, the overlapping of the discharge periods is avoided by phase-shifting of the second duty instruction signal D32 from the phase of the first duty instruction signal D31 by 30°, as described in the third embodiment. Therefore, the ripple electric current of the capacitor is reduced.

(2) Because of the flattop two-phase modulation process for the first duty instruction signal D31 and the second duty instruction signal D32, the voltage utilization efficiency is improved.

(Fourth and Fifth Embodiments)

Since the fourth and fifth embodiments have similar waveforms of PWM control, two embodiments are explained together, with reference to FIGS. 17A to 20B.

Figure 17A:
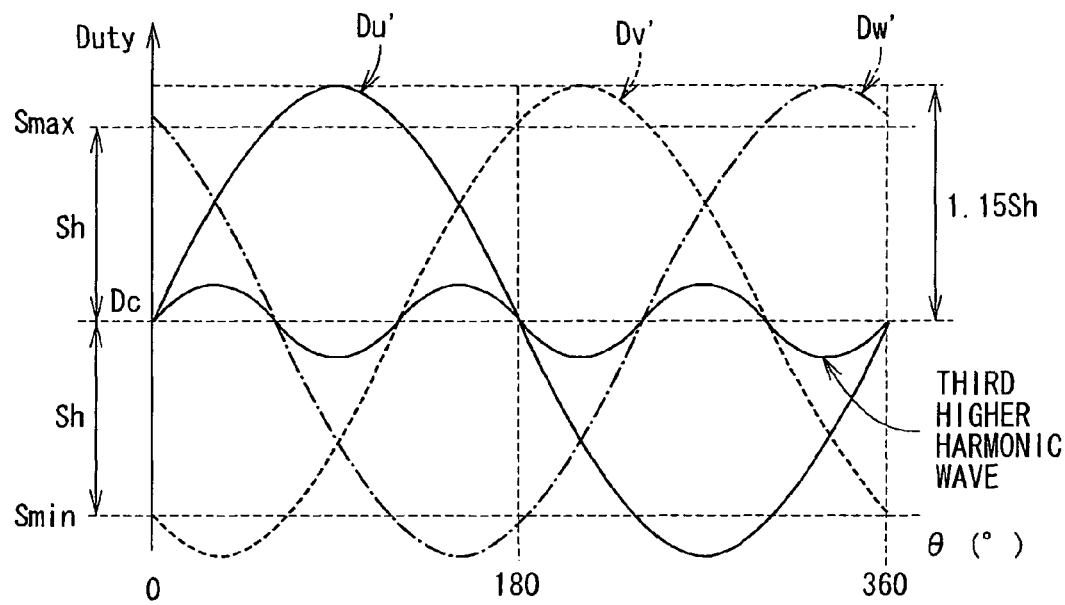
FIGS. 17A and 17B are time charts of a third higher harmonic wave superposing process in a fourth embodiment of the present invention.
Figure 17B:
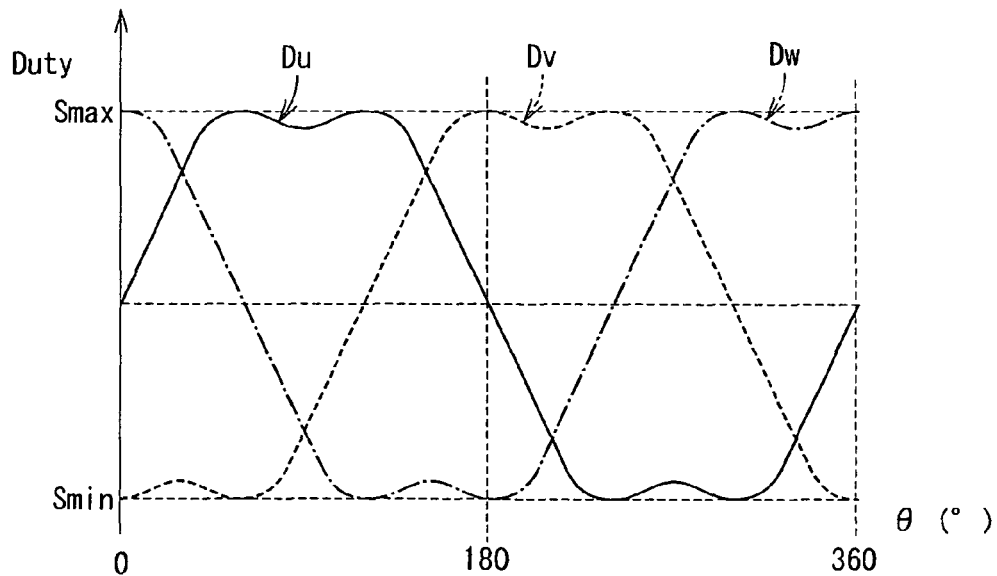

In the fourth embodiment, the modulation processor 653 performs the third higher harmonic wave superposing process. The third higher harmonic wave superposing process is the modulation process that superposes a third higher harmonic wave on a base sine wave of each phase as shown in FIGS. 17A and 17B.

For example, each of the phase duties after the modulation is expressed as the following equations (1) to (5). In those equations, Dc is a center duty value, Smax is a maximum reference value, and Smin is a minimum reference value.

$$Du = \alpha Sh\{\sin\theta + (\sin 3\theta)/6\} + Dc \quad (1)$$

$$Dv = \alpha Sh\{\sin(\theta - 120°) + (\sin 3\theta)/6\} + Dc \quad (2)$$

$$Dw = \alpha Sh\{\sin(\theta + 120°) + (\sin 3\theta)/6\} + Dc \quad (3)$$

$$\alpha = 2/(\sqrt{3}) \approx 1.15 \quad (4)$$

$$Sh = (Smax - Smin)/2 \quad (5)$$

As shown in FIG. 17B, the maximum value Dmax among plural phase duties after the modulation is equal to the maximum reference value Smax, and the minimum value Dmin among plural phase duties after the modulation is equal to the minimum reference value Smin.

Figure 18A:
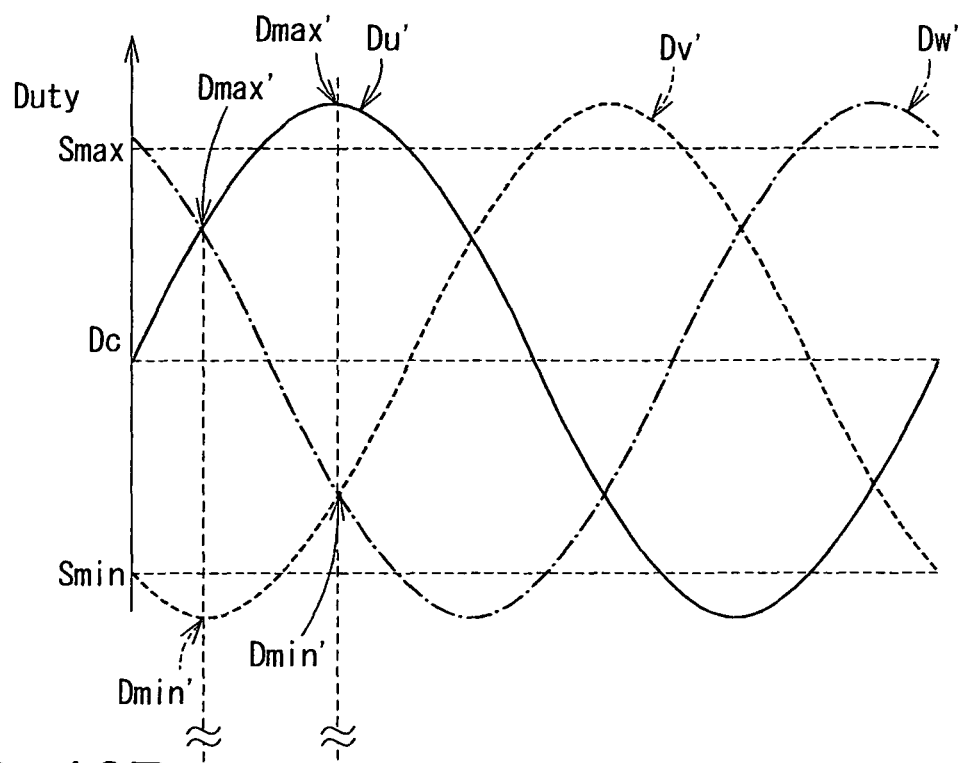
FIGS. 18A and 18B are time charts of a maximum-minimum duty equalizing process (i.e., a pseudo third higher harmonic wave superposing process) in a fifth embodiment of the present invention.
Figure 18B:
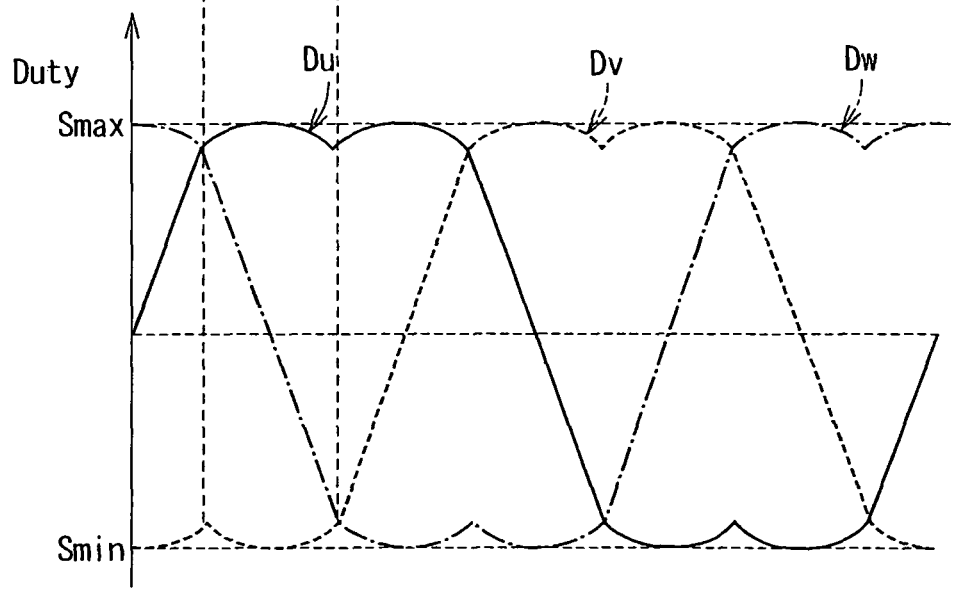

In the fifth embodiment, the modulation processor 653 performs the maximum-minimum duty equalizing process. The maximum-minimum duty equalizing process is a process, as shown in FIGS. 18A and 18B, which calculates an average of the maximum and minimum values and subtracts the calculated average from each of the phase duties. By using the pre-modulation phase duties Du', Dv', Dw' and by using the pre-modulation maximum value Dmax' and the pre-modulation minimum value Dmin', the post-modulation phase duties Du, Dv, Dw are represented as the following equations (6) to (8).

$$Du=Du'-(Dmax'-Dmin')/2 \qquad (6)$$

$$Dv=Dv'-(Dmax'-Dmin')/2 \qquad (7)$$

$$Dw=Dw'-(Dmax'-Dmin')/2 \qquad (8)$$

The waveform of each of the phase duties in the fifth embodiment is similar to the waveform in the fourth embodiment as shown in FIG. 18B. Therefore, the modulation process in the fifth embodiment is designated as a pseudo third higher harmonic wave superposing process.

Figure 19A:
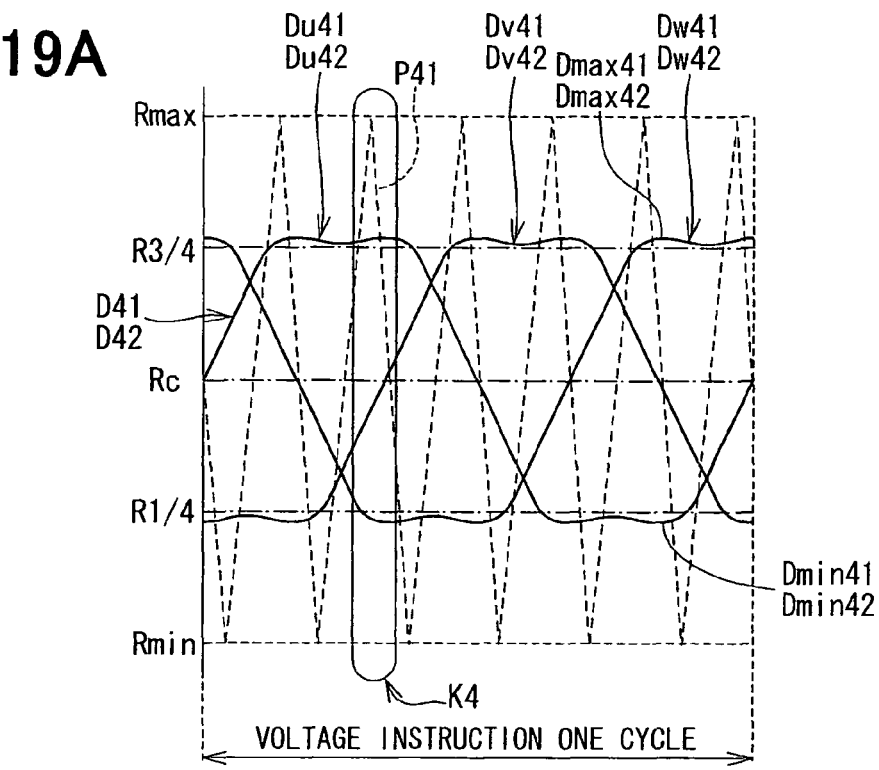
FIGS. 19A and 19B are time charts of the capacitor electric current as a comparative example against the fourth embodiment, in which the duty instruction signals in two systems have the same phase.
Figure 19B:
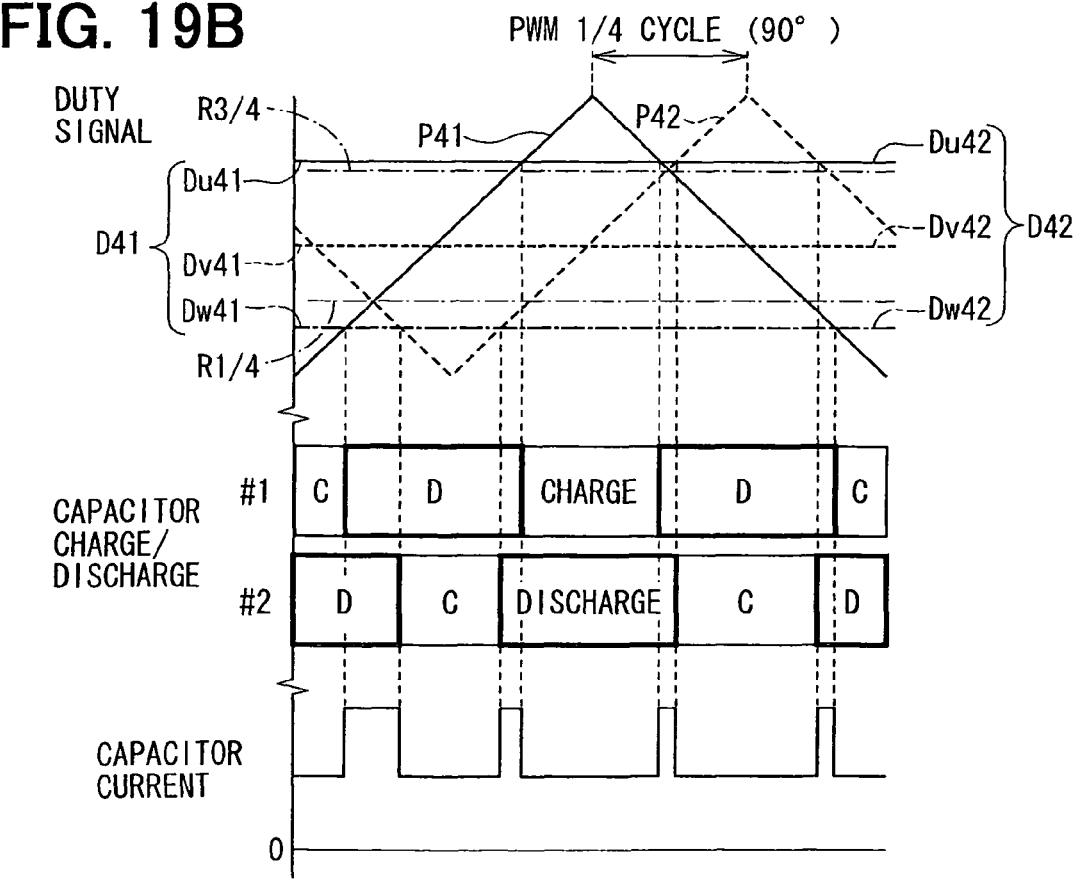

With reference to FIGS. 19A, 19B, 20A and 20B, the fourth and the fifth embodiments are described together. In the following description, the waveform of the fourth embodiment is taken as an representative example. In FIGS. 19A and 19B, the first duty instruction signal D41 and the second duty instruction signal D42 respectively having undergone the third higher harmonic wave superposing process have the same phase as a comparative example for the fourth embodiment.

The first duty instruction signal D41 and the second duty instruction signal D42 have substantially the same amplitude, and have their center values (i.e., the average of the maximum value Dmax41 and the minimum value Dmin41, and the average of the maximum value Dmax42 and the minimum value Dmin42) substantially matching with the center output value Rc. Further, the size of the amplitude is slightly greater than 25% of the allowable duty output range that can be output. Therefore, when a middle value between the maximum Rmax of the allowable duty output range and the center output value Rc is designated as an upper quarter value R3/4, and a middle value between the minimum Rmin of the allowable duty output range and the center output value Rc is designated as a lower quarter value R1/4, the maximum values Dmax41, Dmax42 of both of the duty instruction signals D41, D42 are slightly greater than the upper quarter value R3/4, and the minimum values Dmin41, Dmin42 of both of the duty instruction signals D41, D42 are slightly smaller than the lower quarter value R1/4. Further, the duty instruction signals D41, D42 take the maximum value Dmax41 and Dmax42, at a timing of every 60° at the same time (i.e., in synchronization), and the duty instruction signals D41, D42 take the minimum value Dmin41, Dmin42 also at the same timing (i.e., in synchronization) at every 60°.

FIG. 19B is an enlarged diagram of a period K4 in FIG. 19A, for the illustration purpose.

The greatest U-phase duty Du41 in the first duty instruction signal D41 and the greatest U-phase duty Du42 in the second duty instruction signal D42 have substantially the same amplitude shown in FIG. 19B. Further, the smallest W-phase duty Dw41 in the first duty instruction signal D41 and the smallest W-phase duty Dw42 in the second duty instruction signal D42 also have substantially the same amplitude.

Therefore, when the phase of the second PWM reference signal P42 is shifted ¼ cycle (90°) of the PWM signal from the first PWM reference signal P41, the discharge period of the second system, which serves as an effective voltage vector generation period of the second PWM reference signal P42, becomes longer than the charge period of the first system, which serves a zero voltage vector V0 generation period, on the mountain side of the first PWM reference signal P41. Further, on the valley side of the second PWM reference signal P42, the discharge period of the first system, which serves as an effective voltage vector generation period of the first PWM reference signal P41, becomes longer than the charge period of the second system, which serves as a zero voltage vector V7 generation period. Therefore, the discharge periods of the first system and the second system overlap with each other four times in one cycle of the voltage instruction signal, thereby causing an increase of the ripple electric currents.

Figure 20A:
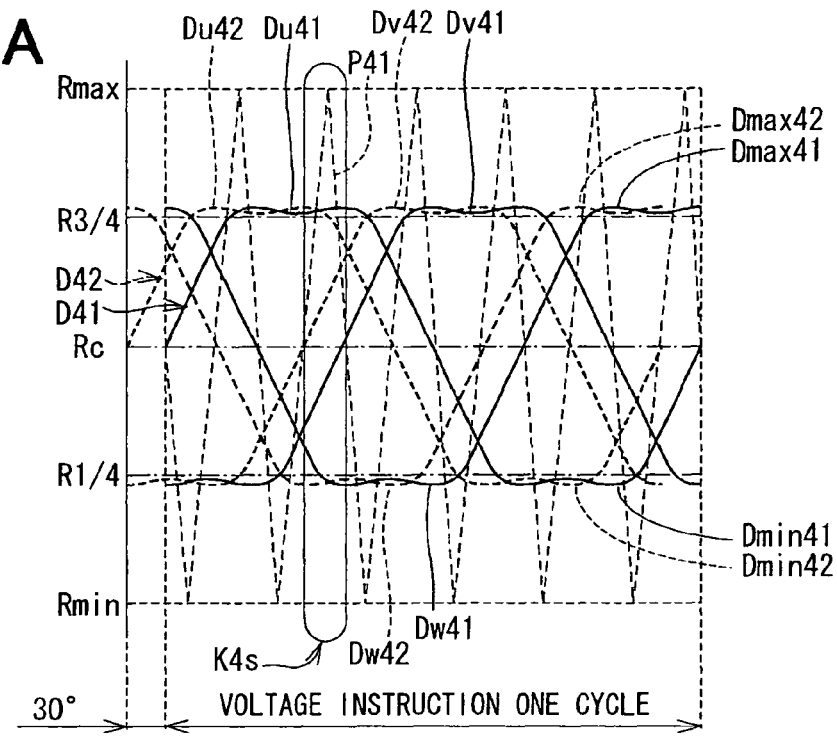
FIGS. 20A and 20B are time charts of the capacitor electric current as a modification of the third embodiment, in which the duty instruction signals in two systems have the phase shift of 30 degrees.
Figure 20B:
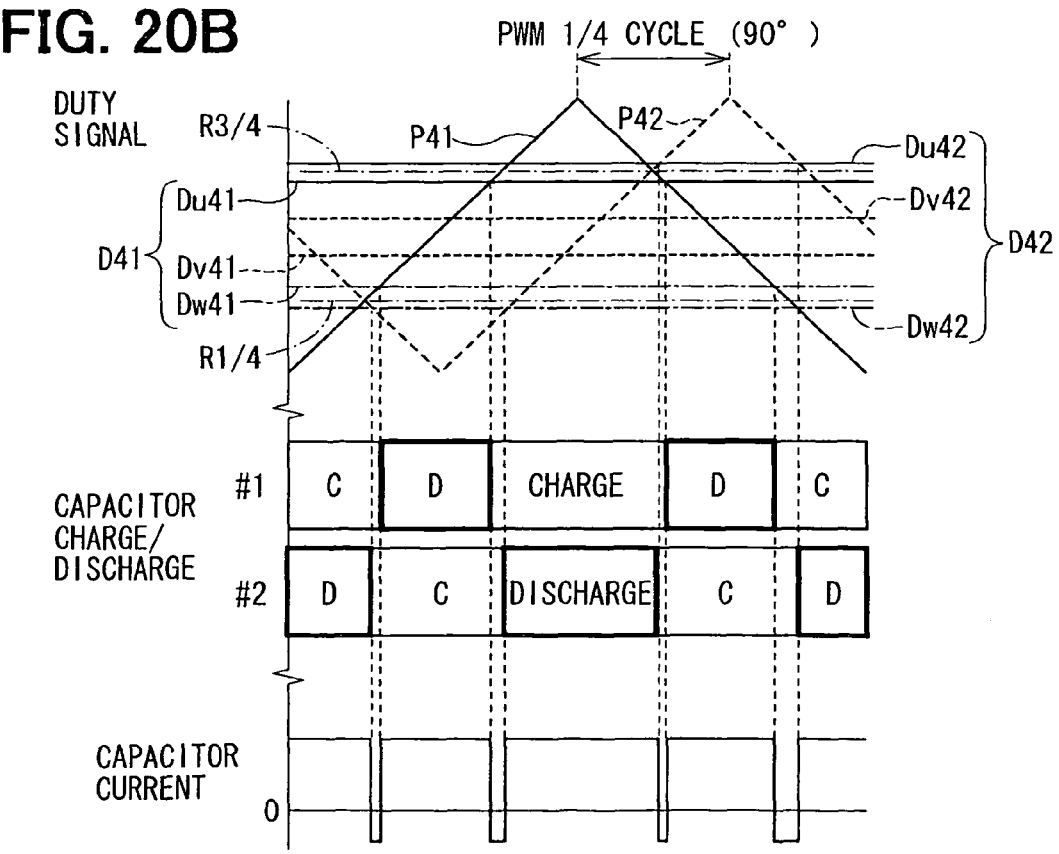

FIGS. 20A and 20B show an example, where phase-shift of 30° regarding the second duty instruction signal D42 relative to the phase of the duty instruction signal D41 is shown. In this case, a timing when the first duty instruction signal D41 takes the maximum value Dmax41 and a timing when the second duty instruction signal D42 takes the maximum value Dmax42 are shifted 30° from each other. That is, the second duty instruction signal D42 takes the maximum value Dmax42 right in the middle (i.e., at a center) of two timings when the first duty instruction signal D41 takes the maximum value Dmax41 at every 60°. Likewise, a timing when the first duty instruction signal D41 takes the minimum value Dmin41 and a timing when the second duty instruction signal D42 takes the minimum value Dmin42 are shifted 30° from each other. That is, the second duty instruction signal D42 takes the minimum value Dmin42 right in the middle (i.e., at a center) of two timings when the first duty instruction signal D41 takes the minimum value Dmin41 at every 60°.

FIG. 20B is an enlarged diagram of a period K4s in FIG. 20A, for the illustration purpose. On the mountain side of the first PWM reference signal P41, the greatest U-phase duty Du41 in the first duty instruction signal D41 is smaller than the greatest U-phase duty Du42 in the second duty instruction signal D42 as shown in FIG. 20B. Further, on the valley side of the second PWM reference signal P42, the smallest W-phase duty Dw42 in the second duty instruction signal D42 is smaller than the smallest W-phase duty Dw41 in the first duty instruction signal D41.

Therefore, when the phase of the second PWM reference signal P42 is shifted from the phase of the first PWM reference signal P41 by ¼ cycle charge period of the first system, which servers as a zero voltage vector V0 generation period on the mountain side of the first PWM reference signal P41, becomes longer than the discharge period of the second system, which serves as an effective voltage vector generation period of the second PWM reference signal P42. Further, the charge period of the second system, which serves as a zero voltage vector V7 generation period on the valley side of the second PWM reference signal P42, becomes longer than the discharge period of the first system, which serves as an effective voltage vector generation period of the first PWM reference signal P41. Therefore, there is no overlapping of the discharge periods between the first system and the second system. Therefore, a ripple electric current is reduced.

(Advantages of the Fourth Embodiment)

The electric power converter in the fourth embodiment has the following advantageous effects (1), (2), which corresponds to the advantageous effects (1), (2) of the first embodiment. Further, the advantageous effects (3), (4) of the first embodiment are shared with the fourth embodiment.

(1) In a condition that the maximum values Dmax41, Dmax42 are smaller than the upper quarter value R3/4 and the minimum values Dmin41, Dmin42 are greater than the lower quarter value R1/4 regarding the first duty instruction signal D41 and the second duty instruction signal D42 respectively having undergone the third higher harmonic wave superposing process, an effective voltage vector generation period of the first duty instruction signal D41 and an effective voltage vector generation period of the second duty instruction signal D42 do not overlap with each other when the phase of the second PWM reference signal P42 is shifted by ¼ cycle from the first PWM reference signal P41, even if both duty instruction signals D41, D42 have the same amplitude and the same phase. Therefore, a problematic increase of the ripple electric current due to the overlapping of the discharge periods will not be caused.

However, in a condition that the maximum values Dmax41, Dmax42 are greater than the upper quarter value R3/4 and the minimum values Dmin41, Dmin42 are smaller than the lower quarter value R1/4 regarding the first/second duty instruction signals D41, D42, the overlapping of the discharge periods occurs when the phase of the second PWM reference signal P42 is shifted by ¼ cycle from the first PWM reference signal P41 if both duty instruction signals D41, D42 have the same phase.

Therefore, when both of the maximum values Dmax41, Dmax42 are within a predetermined range from the center output value Rc, as advantageously devised in the fourth embodiment, the overlapping of the discharge periods is avoided by phase-shifting of the second duty instruction signal D32 from the phase of the first duty instruction signal D31 by 30°. Therefore, the ripple electric current of the capacitor is reduced.

(2) Because of the third higher harmonic wave superposing process for the first duty instruction signal D41 and the second duty instruction signal D42, the voltage utilization efficiency is improved. Further, regarding the fifth embodiment, the voltage utilization efficiency is also improved due to the maximum-minimum duty equalizing process for the first duty instruction signal D51 and the second duty instruction signal D52.

(Modifications)

Although the present invention has been fully described in connection with the first to the fifth embodiments, it is to be noted that various changes and modifications may be implemented as exemplified below.

Figure 21:
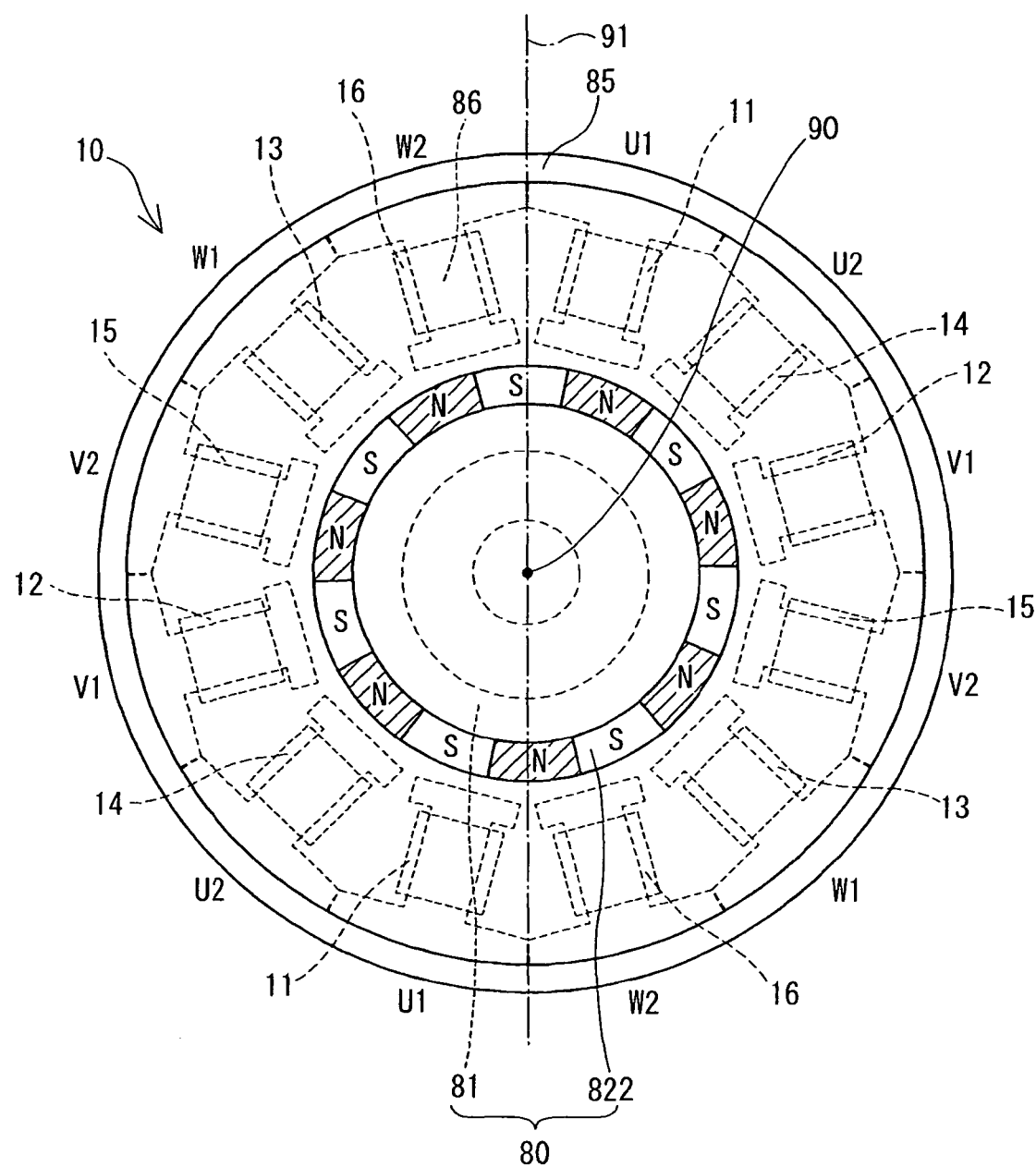
FIG. 21 is a schematic side view of the motor in a modification of the embodiments of the present invention.

(1) Configurations of a three-phase motor having two systems In the foregoing embodiments, the rotor 80 in the three-phase motor 10 having two systems has a total of ten poles in five NS pole pairs regarding the permanent magnet set 821, as shown in FIG. 2. As a modification to such configuration, as shown in FIG. 21, a permanent magnet set 822 may have 14 poles in seven NS pole pairs in an alternative arrangement. Even in such modified configuration, the stator 85 is configured to have twelve coils wound on twelve protrusions 86 disposed thereon.

In the foregoing embodiments, the number of stator coils is (12×m), and the number of magnetic poles on the rotor 80 is (2×m) with "m" being a natural number. For example, FIGS. 22A to 22C illustrate an example of m=2, and FIGS. 23A to 23C illustrates an example of m=5.

Figure 22A:
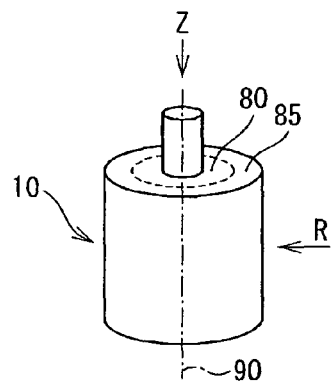
FIGS. 22A to 22C are schematic views of the motor in a modification of the embodiments of the present invention.
Figure 23A:
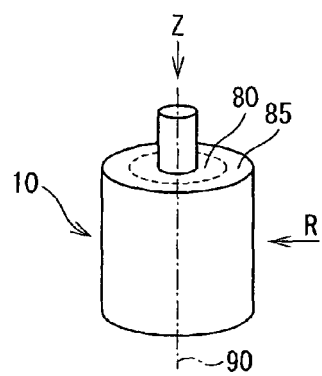
FIGS. 23A to 23C are schematic views of the motor in a modification of the embodiment of the present invention.
Figure 23B:
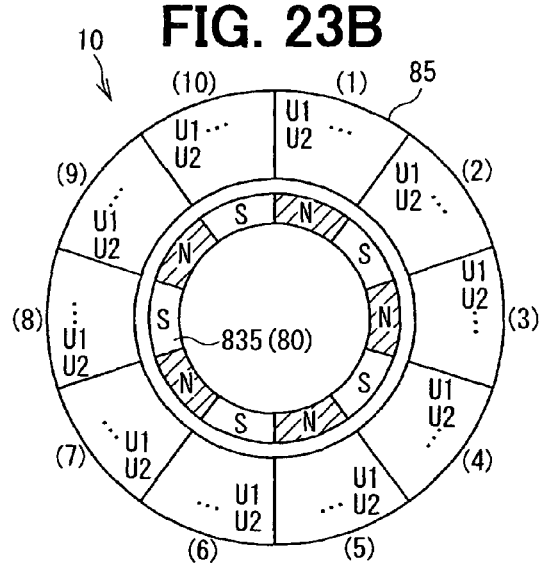
Figure 23C:
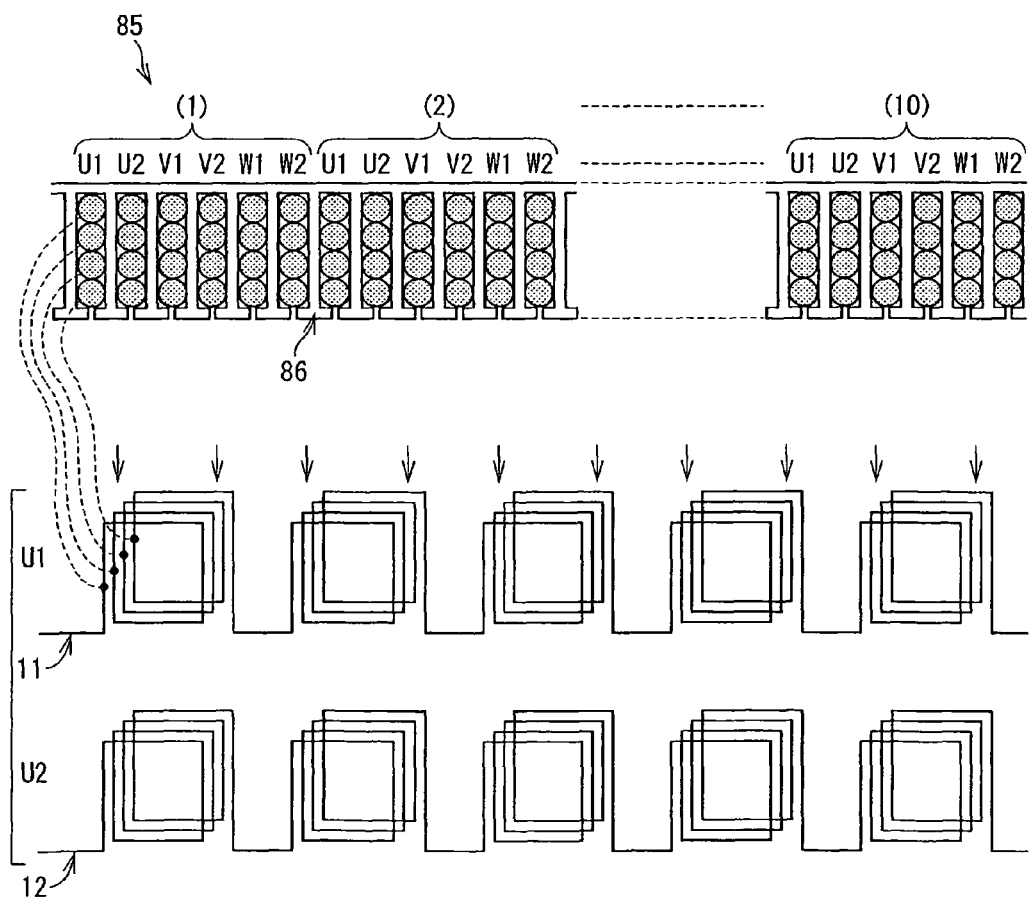

As shown in FIG. 22A, the motor 10 has the rotor 80, which has the stator 85 turning around on the axis 90.

Figure 22B:
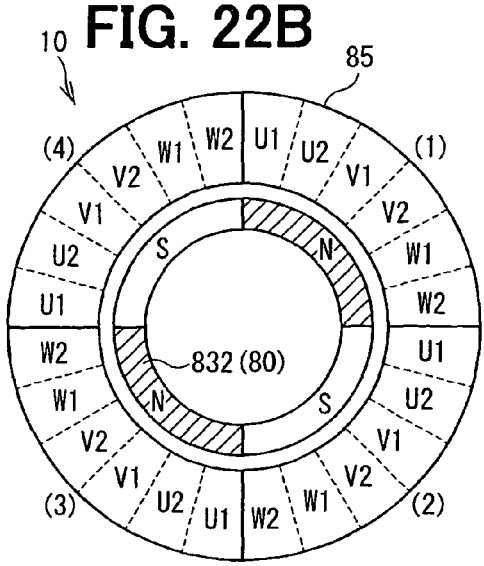

FIG. 22B is an illustration of the arrangement of a permanent magnet set 832 on the rotor 80 and the stator 85 seen from a thrust direction Z (cf. FIG. 22A). The permanent magnet set 832 has two pairs of N poles and S poles alternatively disposed, which add up to a total of 4 (=2×2) poles. The stator coils are divided into four groups of six coils, that is, 24 (=12×2) coils in total. In one of four coil groups, there are a U1 coil, a U2, coil, a V1 coil, a V2 coil, a W1 coil, and a W2 coil, arranged in this order in a clockwise direction.

Figure 22C:
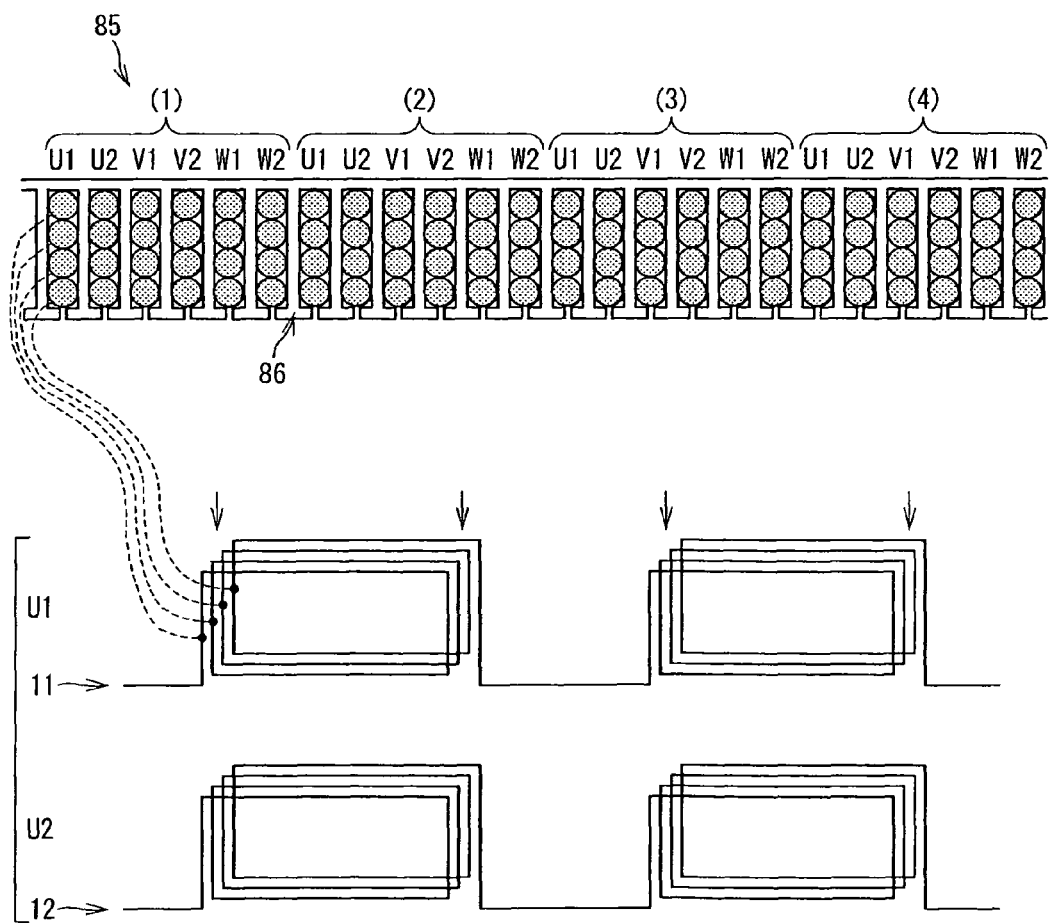

FIG. 22C is a development of the stator 85 seen in the thrust direction Z, and FIG. 22D is a development of winding wires seen in a radial direction R (cf. FIG. 22A). As shown in FIG. 22C, the winding wire forming the U1 coil is, for example, one conductive wire that is wound in sequence on one of every six protrusions 86.

In such arrangement, the U2 coil in the second winding wire group has an advanced position by an electrical angle of 30° shifted in the circumferential direction relative to the U1 coil in the first winding wire group. Therefore, the PWM control to advance the phase of the second duty instruction signal by 30° degrees relative to the phase of the first duty instruction signal is enabled.

Further, for the case of m=5, FIG. 23B is an illustration of a permanent magnet set 835 of the rotor 80 and the stator 85 seen in the thrust direction Z (cf. FIG. 23A). The permanent magnet set 835 has five pairs of N poles and S poles alternatively disposed, which add up to a total of 10 (=5×2) poles. The stator coils are divided into ten groups of six coils, that is, 60 (=12×5) coils in total. Other configurations are the same as the case of m=2.

In this modification, the number "m" can be arbitrarily set according to the motor size and/or the desired output. Therefore, the motor 10 can have a wide range of applicability.

(2) Positions of the Electric Current Detectors

Modifications to the positions of the electric current detector 41 to 46 are shown in FIGS. 24A to 24H. Further, in FIGS. 24A to 24H, only the first inverter unit 20 and the first winding wire group 18 are shown, and the second inverter unit 30 and the second winding wire group 19 are omitted from the illustration.

Figure 24A:
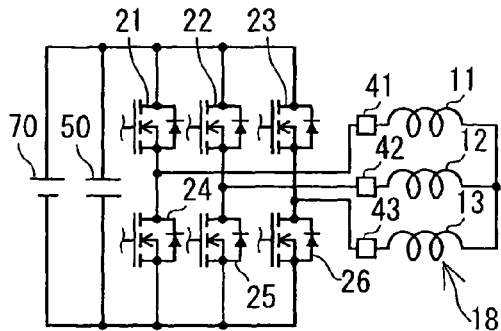
FIGS. 24A to 24H are schematic diagrams of an electric current detection unit in a further modification of the embodiments of the present invention.
Figure 24B:
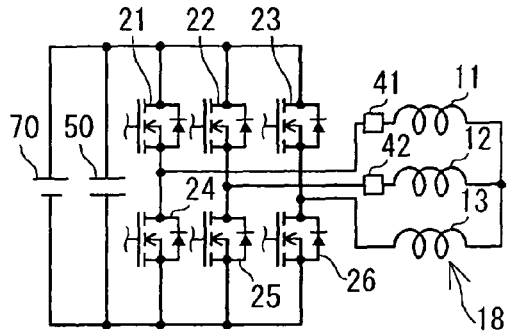

FIG. 24A shows the configuration of the first embodiment (cf. FIG. 1). The electric current detectors 41 to 43 are disposed between each of the connection points between the upper-FETs 21 to 23 and the lower FETs 24 to 26. Here, the electric current detector of either one of three phases may be omitted from among the three detectors. For example, when the W1 current detector 43 is omitted as shown in FIG. 24B, the W-phase electric current may be detected by subtracting the electric current detection values of the U1 current detector 41 and the electric current detection value of the V1 current detector 42 from a power supply electric current.

Figure 24C:
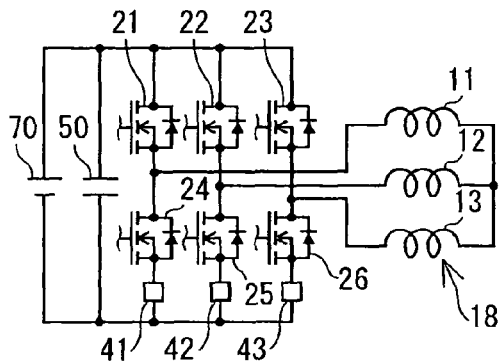
Figure 24D:
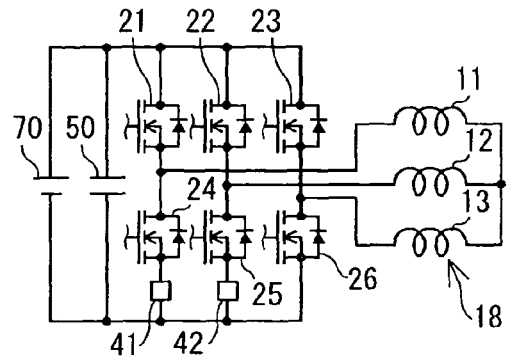

In another modification, the electric current detectors 41 to 43 may be disposed on the ground side of the lower FETs 24 to 26 as shown in FIG. 24C. The electric current detector in one of three phases may be omitted from among the three detectors as shown in FIG. 24D based on the same reason as the modification of FIG. 24B.

Figure 24E:
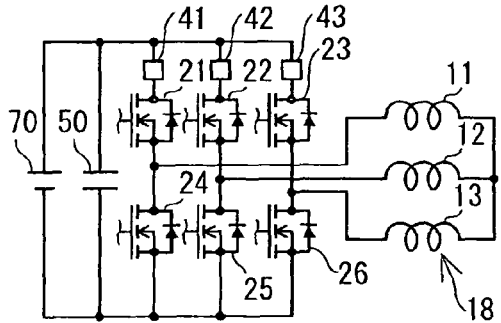
Figure 24F:
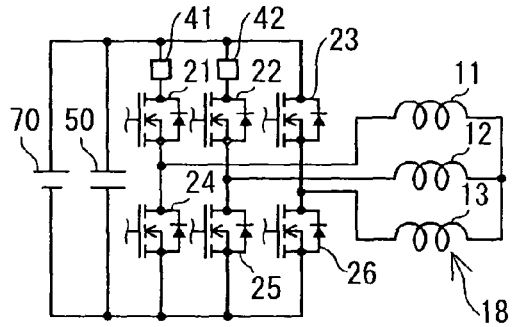

Alternatively, the electric current detectors 41 to 43 may be disposed on the power supply side of the upper FETs 21 to 23 as shown in FIG. 24E. Further, the electric current detector in one of three phases may be omitted from among the three detectors as shown in FIG. 24F based on the same reason as the modification of FIG. 24B.

Figure 24G:
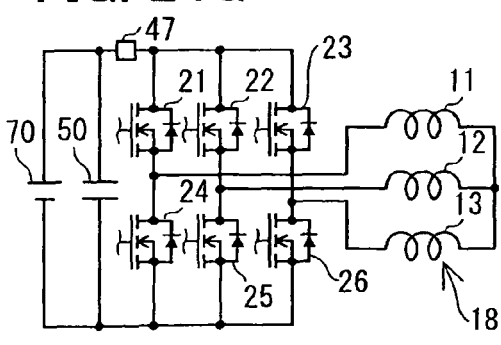

Further, in yet another modification, the electric current detector 47 may be disposed between the anode side of the capacitor 50 and a branch point of the bridge circuit on a power supply side of the first inverter unit 20 as shown in FIG. 24G. In such case, the electric current detector 47 detects a total of the electric current detection values of the electric current detectors 41 to 43 in FIG. 24E.

Figure 24H:
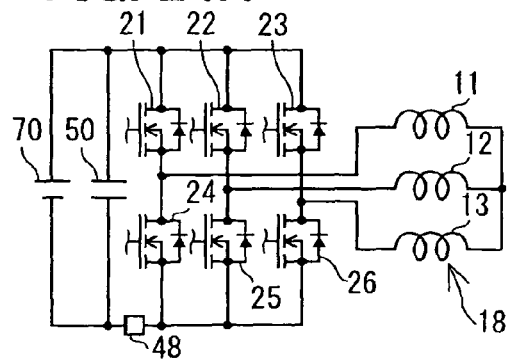

Alternatively, the electric current detector 48 may be disposed between a cathode side of the capacitor 50 and a junction point of the bridge circuit on the ground side of the first inverter unit 20 as shown in FIG. 24H. In such case, the electric current detector 48 detects a total of the electric current detection values of the electric current detectors 41 to 43 in FIG. 24C.

(3) Types of the Electric Current Detector

When the electric current detectors 41 to 43 are disposed at the positions as shown in FIGS. 24A and 24B, it is preferable that a Hall element is used as the electric current detector. In such a case, because a winding wire electric current is directly detected regardless of switching operation of FETs 21 to 26, the minimum Rmin of the allowable duty output range is determined as 0% and the maximum Rmax of the allowable duty output range determined as 100%, as described in the description of FIGS. 11A and 11B in the first embodiment.

On the other hand, when the electric current detectors 41 to 43 are disposed at the positions of FIGS. 24C to 24F, the a shunt resistor may be used in place of the Hall element.

When the shunt resistor is disposed as the electric current detector on the ground side of the lower FET as shown in FIG. 24C or 24D, a mountain side electric current of the PWM reference signal is detected as a winding wire electric current, because the mountain side electric current flowing through the electric current detectors 41 to 43 at a time of turning on of all of the lower FETs 24 to 26 is equal to the electric current flowing through the winding wire group 18.

In such a case, the detection (i.e., sample hold) of the electric current should be delayed until after a convergence of rigging in the shunt resistor from the transmission of an on signal from the control unit to each of the gates of the lower FETs 24 to 26. That is, only when the zero voltage vector V0 generation period is longer than the rigging convergence time, the mountain side electric current can be detected by the shunt resistor. Therefore, because the duty instruction signal cannot be set in a period where the PWM reference signal is close to 100%, the maximum value Rmax of the allowable duty output range that can be output is preferably determined based on a minimum time required to detect the electric current. For example, if the rigging convergence time is 4.5 μs, the maximum value Rmax of the allowable duty output range that can be output is about 93%.

To the contrary, when the shunt resistor is disposed as the electric current detector on the power supply side of the upper FET as shown in FIG. 24E or 24F, a valley side electric current of the PWM reference signal is detected as a winding wire electric current, because the valley side electric current flowing through the electric current detectors 41 to 43 at a time of turning on of all of the upper FETs 21 to 23 is equal to the electric current flowing through the winding wire group 18.

In such a case, due to the above-described reason, only when the zero voltage vector V7 generation period is longer than the rigging convergence time, the valley side electric current can be detected by the shunt resistor. Therefore, because the duty instruction signal cannot be set in a period where the PWM reference signal is close to 0%, the minimum value Rmin of the allowable duty output range that can be output is preferably determined based on a minimum time required to detect the electric current. For example, if the rigging convergence time is 4.5 μs, the minimum value Rmin of the allowable duty output range that can be output is about 7%.

Further, for the purpose of correction of the winding wire electric current against the error caused by the temperature change of the shunt resistor and/or the amplifier circuit, a valley side electric current at a time of turning off of all of the lower FETs 24 to 26 may further be detected in a configuration that the shunt resistor is disposed on the ground side of the lower FET. Alternatively, a mountain side electric current at a time of turning off of all of the upper FETs 21 to 23 may further be detected in a configuration that the shunt resistor is disposed on the power supply side of the upper FET. In such cases, it is preferable to determine both of the maximum value Rmax and the minimum value Rmin of the allowable duty output range that can be output.

In addition, a gate driver circuit of bootstrap method is required to turn on all of the lower FETs 24 to 26 at predetermined intervals. Due to such requirements, the maximum value of the allowable duty output range cannot be set to 100%. Therefore, it may be preferable to determine the maximum value Rmax of the allowable duty output range based on the configuration of the gate driver circuit.

Figure 25A:
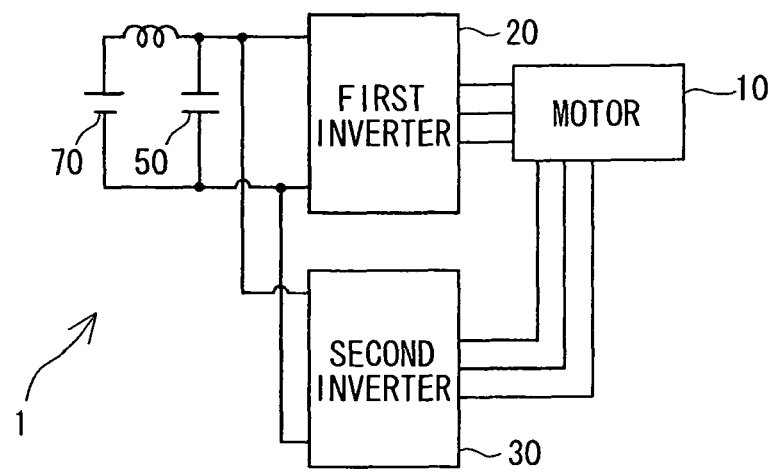
FIGS. 25A and 25B are circuit diagrams of the motor in a still further modification of the embodiments of the present invention.
Figure 25B:
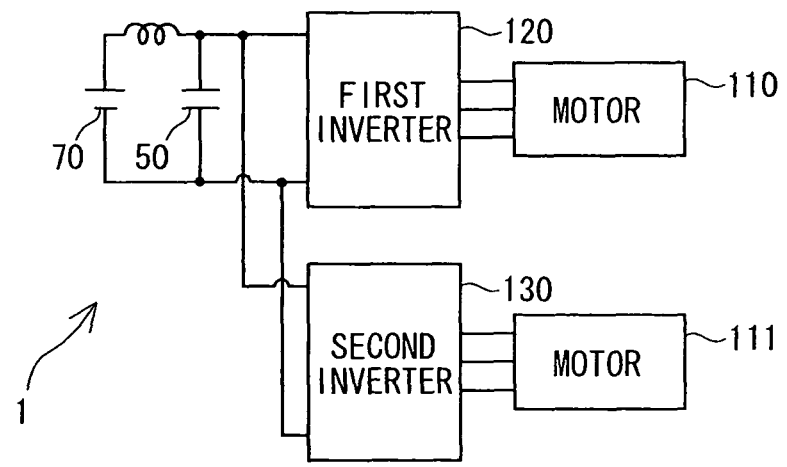

(4) In the foregoing embodiments, as shown in FIG. 25A, two systems of inverter units 20 and 30 drive one motor 10. However, two systems of inverters, that is, a first inverter unit 120 and a second inverter unit 130 may drive respectively different motor 110 and motor 111, as shown in FIG. 25B.

(5) In the first embodiment described above, the first duty instruction signal D1 undergoes the flatbed two-phase modulation process and the second duty instruction signal D2 undergoes the flattop two-phase modulation process. However, in a reversed manner, the first duty instruction signal D1 may undergo the flattop two-phase modulation process and the second duty instruction signal D2 may undergo the flatbed two-phase modulation process.

(6) In the foregoing embodiments, a duty instruction signal before the modulation is a sine wave signal. However, the signal waveform may not be limited to the sine wave.

(7) In the foregoing embodiments, the phase of the second duty instruction signal D2 is advanced by 30 degrees relative to the phase of the first duty instruction signal D1. In such case, because the U-phase duty Du, the V-phase duty Dv, and the W-phase duty Dw are the signals having the same amplitude and the same waveform with the phase-difference of 120° with each other, each of those duties may be mutually replaceable. That is, the phase of the second duty instruction signal D2 may be advanced relative to the phase of the first duty instruction signal D1 by 150°, 270° or degrees of (30+120×n) with "n" being an integer.

Further, the stator coil may have a reversed arrangement, in terms of the arrangement of coils in the first winding wire group 18 and in the second winding wire group 19, so that the phase of the second duty instruction signal D2 may be delayed relative to the phase of the first duty instruction signal D1 by degrees of (30+120×n) with "n" being an integer.

(8) The three-phase rotary electric machine serving as a motor in the foregoing embodiments may be replaced with a rotary electric machine serving as a generator. Further, for example, the three-phase rotary electric machine may be applicable to not only the electric power steering device, but also various other purposes such as a device driving a power window or the like.

The present invention is not limited to the foregoing embodiments and the modifications, but may be implemented in other embodiments and modifications.

What is claimed is:

1. An electric power converter for a three-phase rotary electric machine, which includes two groups of winding wires for each phase of the rotary electric machine, the electric power converter comprising:
  two inverter units respectively including bridge circuits provided in correspondence to the two groups of winding wires, each bridge circuit including a high voltage side switching element and a low voltage side switching element for each phase of the two groups of winding wires;
  a capacitor connected to a power supply side and a ground side of each of the two inverter units; and
  a control unit configured to control ON-OFF switching of the high voltage side switching elements and the low voltage side switching elements by comparing a voltage instruction signal, which indicates voltages respectively applied to the two groups of winding wires, with a predetermined PWM reference signal, wherein the control unit is configured to perform in each of the two inverter units a modulation process that modulates the voltage instruction signal regarding the voltages respectively applied to the two groups of winding wires, the modulation process modulates the voltage instruction signal by controlling an effective voltage vector generation period for each of the two inverter units, as being non-overlapping with each other, where the effective voltage vector generation period is when (a) one phase or two phases of one of the high voltage side switching elements and the low voltage side switching elements are being turned on and (b) the remaining two phases or the remaining one phase of the other one of the high voltage side switching elements and the low voltage side switching elements are being turned off, and wherein the control unit is configured to shift respective phases of the voltage instruction signals regarding the voltages applied to the two groups of winding wires by 30+120×n degrees, where "n" represents an integer number, and wherein the voltage instruction signal for each of the two groups of winding wires attains a maximum value at every interval of 60 degrees.

2. The electric power converter of claim 1, wherein:
the control unit is configured to control PWM reference signals corresponding to the two inverter units to have a same frequency and a same phase;
the control unit is configured to subtract, from the voltage instruction signals of all of the three phases, a difference value derived by subtracting a predetermined lower limit value from a smallest voltage instruction signal among the voltage instruction signals of the three phases, so that the smallest voltage instruction signal in the voltage instruction signals respectively corresponding to the three phases has the predetermined lower limit value in one of the two inverter units; and
the control unit is configured to subtract, from the voltage instruction signals of all of the three phases, a difference value derived by subtracting a predetermined upper limit value from a greatest voltage instruction signal among the voltage instruction signals of the three phases so that the greatest voltage instruction signal in the voltage instruction signals respectively corresponding to the three phases has the predetermined upper limit value in the other one of the two inverter units.

3. The electric power converter of claim 1, wherein:
the control unit is configured to control PWM reference signals corresponding to the two inverter units to have a same frequency, and shift the phases of the PWM reference signals by 180° from each other; and
the control unit is configured to subtract, from the voltage instruction signals of all of the three phases, a difference value derived by subtracting a predetermined lower limit value from a smallest voltage instruction signal among the voltage instruction signals of the three phases, so that the smallest voltage instruction signal in the voltage instruction signals respectively corresponding to the three phases has the predetermined lower limit value.

4. The electric power converter of claim 1, wherein:
the control unit is configured to control PWM reference signals corresponding to the two inverter units to have a same frequency, and shift the phases of the PWM reference signals by 180 degrees from each other; and
the control unit subtracts, from the voltage instruction signals of all of the three phases, a difference value derived by subtracting a predetermined upper limit value from a greatest voltage instruction signal among the voltage instruction signals of the three phases, so that the greatest voltage instruction signal in the voltage instruction signals respectively corresponding to the three phases has the predetermined upper limit value.

5. The electric power converter of claim 1, wherein:
the control unit is configured to control PWM reference signals corresponding to the two inverter units to have a same frequency, and shift the phases of the PWM reference signals by 90 degrees from each other;
the control unit is configured to control center values of the voltage instruction signals corresponding to the three phases to be matched with a center value of an allowable voltage output range; and
the control unit is configured to add a third higher harmonic wave to the voltage instruction signals of all of the three phases.

6. The electric power converter of claim 1, wherein:
the control unit is configured to control PWM reference signals corresponding to the two inverter units to have a same frequency, and shift the phases of the PWM reference signals by 90 degrees from each other;
the control unit is configured to control center values of the voltage instruction signals corresponding to the three phases to be matched with a center value of an allowable voltage output range; and
the control unit is configured to calculate an average value of a greatest voltage instruction signal and a smallest voltage instruction signal among all voltage instruction signals, and subtract a calculated average value from the voltage instruction signals of all of the three phases.

7. A driving apparatus comprising:
a three-phase rotary electric machine, which includes two groups of winding wires for each phase; and
the electric power converter according to claim 1,
wherein the number of winding of the winding wires and the number of magnetic poles in both of the two groups of winding wires of the rotary electric machine are determined to output a same amount of attracting force and repulsive force toward and against corresponding magnetic poles in the rotary electric machine, when electric currents supplied to the two inverter units of the electric power converter have the phase shift of 30+120×n degrees.

8. The driving apparatus of claim 7, wherein:
the rotary electric machine has a stator provided at a radially outside part and a rotor provided at a radially inside part;
the two groups of winding wires of the rotary electric machine are wound on the stator, and include twelve winding wires, two winding wires of a same phase between the two groups of winding wires being shifted from each other by 30° in a circumferential direction of the stator; and
the rotor has 10 or 14 magnetic poles.

9. The driving apparatus of claim 7, wherein:
the rotary electric machine has a stator provided at a radially outside part and a rotor provided at a radially inside part;
the two groups of winding wires are wound on the stator and formed of 12×m pieces of winding wires with "m" being a natural number, corresponding two winding wires between the two groups of winding wires being shifted from each other by 30 degrees in a circumferential direction of the stator; and
the rotor has 2×m magnetic poles.

10. The driving apparatus of claim 7, wherein:
the rotary electric machine is provided in an electric power steering system in a vehicle.

11. An electric power converter for a three-phase rotary electric machine, which includes two groups of windings, each group being formed of windings corresponding to each phase of the electric machine, the power converter comprising:
- a battery;
- a capacitor connected to be charged by the battery;
- two inverters connected to both of the battery and the capacitor, each inverter having switching elements connected in a bridge form corresponding to each phase of the groups of windings and supplying currents from the battery and the capacitor to the electric machine corresponding to on/off-states of the switching elements; and
- a control unit, which controls switching-on/off of the switching elements in the inverters based on comparisons of voltage instruction signals regarding voltages applied to the groups of windings with PWM reference signals, wherein the control unit includes a modulation part for modulating amplitudes of the voltage instruction signals thereby to control the switching-on/off of the switching elements so that the capacitor is prevented from discharging to both of the inverters at same time, and wherein the control unit includes a phase shift part for shifting phases of the voltage instruction signals by 30+120×n degrees from each other, where "n" represents an integer number, and wherein the voltage instruction signal for the two groups of winding attains a maximum value at every interval of 60 degrees.

* * * * *